(12) United States Patent
Tong et al.

(10) Patent No.: US 10,302,874 B2
(45) Date of Patent: May 28, 2019

(54) ALIGNMENT SLEEVE ASSEMBLY AND FIBER OPTIC ADAPTER

(71) Applicant: CommScope Telecommunications (Shanghai) Co., Ltd., Shanghai (CN)

(72) Inventors: Zhaoyang Tong, Shanghai (CN); Xingjun Cheng, Shanghai (CN); Lei Liu, Shanghai (CN)

(73) Assignee: CommScope Telecommunications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/574,389

(22) PCT Filed: May 13, 2016

(86) PCT No.: PCT/CN2016/082021
§ 371 (c)(1),
(2) Date: Nov. 15, 2017

(87) PCT Pub. No.: WO2016/184363
PCT Pub. Date: Nov. 24, 2016

(65) Prior Publication Data
US 2018/0143384 A1     May 24, 2018

(30) Foreign Application Priority Data

May 15, 2015   (CN) .......................... 2015 1 0247621
May 15, 2015   (CN) ...................... 2015 2 0319609 U

(51) Int. Cl.
*G02B 6/38* (2006.01)

(52) U.S. Cl.
CPC .............. *G02B 6/3871* (2013.01); *G02B 6/38* (2013.01); *G02B 6/3825* (2013.01); *G02B 6/3874* (2013.01)

(58) Field of Classification Search
CPC ... G02B 6/3871; G02B 6/3825; G02B 6/3874
See application file for complete search history.

(56) References Cited

U.S. PATENT DOCUMENTS 2,331,920 A   10/1943   McMaster
3,624,887 A   12/1971   Hilbert
(Continued)

FOREIGN PATENT DOCUMENTS

AU       696950        8/1996
CA       2149681      12/1995
(Continued)

OTHER PUBLICATIONS

International Search Report and Written Opinion of the International Searching Authority for corresponding International Patent Application No. PCT/CN2016/082021 dated Jul. 28, 2016, 11 pages.

(Continued)

*Primary Examiner* — Ryan A Lepisto
(74) *Attorney, Agent, or Firm* — Merchant & Gould P.C.

(57) ABSTRACT

A fiber optic adapter, including: a mating retainer; an alignment sleeve received in the mating retainer, a ferrule of a fiber optic connector being adapted to be inserted into the alignment sleeve through an insertion port of the fiber optic adapter; and an adjustment element configured to adjust a circumferential angle of the alignment sleeve relative to the mating retainer to a predetermined circumferential angle and hold the alignment sleeve at the predetermined circumferential angle relative to the mating retainer. The adjustment element may adjust the circumferential angle of the alignment sleeve with respect to the mating retainer to the predetermined circumferential angle, for example, at which the fiber insertion loss of the coupled connectors is minimal, and hold the alignment sleeve at the predetermined circumferential angle. In this way, it may improve the alignment accuracy of the coupled connectors.

23 Claims, 16 Drawing Sheets

(56) References Cited

U.S. PATENT DOCUMENTS

| | | |
|---|---|---|
| 4,611,875 A | 9/1986 | Clarke et al. |
| 4,736,100 A | 4/1988 | Vastagh |
| 4,744,140 A | 5/1988 | Bright |
| 4,747,020 A | 5/1988 | Brickley et al. |
| 4,792,203 A | 12/1988 | Nelson et al. |
| 4,824,196 A | 4/1989 | Bylander |
| 4,861,134 A | 8/1989 | Alameel et al. |
| 4,900,123 A | 2/1990 | Barlow et al. |
| 4,913,522 A | 4/1990 | Nolf et al. |
| 4,948,220 A | 8/1990 | Violo et al. |
| 4,953,929 A | 9/1990 | Basista et al. |
| 4,995,688 A | 2/1991 | Anton et al. |
| 5,023,646 A | 6/1991 | Ishida et al. |
| 5,058,983 A | 10/1991 | Corke et al. |
| 5,067,783 A | 11/1991 | Lampert |
| 5,073,042 A | 12/1991 | Mulholland et al. |
| 5,076,656 A | 12/1991 | Briggs et al. |
| 5,076,688 A | 12/1991 | Bowen et al. |
| 5,082,344 A | 1/1992 | Mulholland et al. |
| 5,142,598 A | 8/1992 | Tabone |
| 5,210,810 A | 5/1993 | Darden et al. |
| 5,212,752 A | 5/1993 | Stephenson et al. |
| 5,214,735 A | 5/1993 | Henneberger et al. |
| 5,224,186 A | 6/1993 | Kishimoto et al. |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,363,465 A | 11/1994 | Korkowski et al. |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,461,690 A | 10/1995 | Lampert |
| 5,469,526 A | 11/1995 | Rawlings |
| 5,481,634 A | 1/1996 | Anderson et al. |
| 5,497,444 A | 3/1996 | Wheeler |
| 5,506,922 A | 4/1996 | Grois et al. |
| 5,511,144 A | 4/1996 | Hawkins et al. |
| 5,542,015 A | 7/1996 | Hultermans |
| 5,579,425 A | 11/1996 | Lampert et al. |
| 5,614,980 A | 3/1997 | Wakabayashi et al. |
| 5,638,474 A | 6/1997 | Lampert et al. |
| 5,647,043 A | 7/1997 | Anderson et al. |
| 5,675,682 A | 10/1997 | De Marchi |
| 5,708,751 A | 1/1998 | Mattei |
| 5,717,810 A | 2/1998 | Wheeler |
| 5,719,977 A | 2/1998 | Lampert et al. |
| 5,734,776 A | 3/1998 | Puetz |
| 5,737,464 A | 4/1998 | Underwood et al. |
| 5,764,834 A | 6/1998 | Hultermans |
| 5,764,844 A | 6/1998 | Mendes |
| 5,774,612 A | 6/1998 | Belenkiy et al. |
| 5,778,132 A | 7/1998 | Csipkes et al. |
| 5,784,515 A | 7/1998 | Tamaru et al. |
| 5,823,646 A | 10/1998 | Arizpe et al. |
| 5,825,955 A | 10/1998 | Ernst et al. |
| 5,838,855 A | 11/1998 | Stephenson |
| 5,883,995 A | 3/1999 | Lu |
| 5,887,095 A | 3/1999 | Nagase et al. |
| 5,909,526 A | 6/1999 | Roth et al. |
| 5,915,058 A | 6/1999 | Clairardin et al. |
| 5,923,805 A | 7/1999 | Anderson et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 5,975,769 A | 11/1999 | Larson et al. |
| 5,984,531 A | 11/1999 | Lu |
| 5,987,203 A | 11/1999 | Abel et al. |
| 5,993,071 A | 11/1999 | Hultermans |
| 6,017,153 A | 1/2000 | Carlisle et al. |
| 6,017,154 A | 1/2000 | Carlisle et al. |
| 6,024,498 A | 2/2000 | Carlisle et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,069,797 A | 5/2000 | Widmayer et al. |
| 6,076,973 A | 6/2000 | Lu |
| 6,076,974 A | 6/2000 | Carlisle et al. |
| 6,076,975 A | 6/2000 | Roth |
| 6,079,881 A | 6/2000 | Roth |
| 6,081,647 A | 6/2000 | Roth et al. |
| 6,096,797 A | 8/2000 | Prantl et al. |
| 6,102,581 A | 8/2000 | Deveau et al. |
| 6,142,676 A | 11/2000 | Lu |
| 6,149,315 A | 11/2000 | Stephenson |
| 6,154,597 A | 11/2000 | Roth |
| 6,155,146 A | 12/2000 | Andrews et al. |
| 6,160,946 A | 12/2000 | Thompson et al. |
| 6,188,687 B1 | 2/2001 | Mussman et al. |
| 6,188,825 B1 | 2/2001 | Bandy et al. |
| 6,196,731 B1 | 3/2001 | Carlisle et al. |
| 6,196,733 B1 | 3/2001 | Wild |
| 6,206,581 B1 | 3/2001 | Discoll et al. |
| 6,208,796 B1 | 3/2001 | Williams Vigliaturo |
| 6,217,230 B1 | 4/2001 | Matsushita |
| 6,227,717 B1 | 5/2001 | Ott et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,247,849 B1 | 6/2001 | Liu |
| 6,250,817 B1 | 6/2001 | Lampert et al. |
| 6,256,443 B1 | 7/2001 | Uruno |
| 6,259,850 B1 | 7/2001 | Crosby, Jr. et al. |
| 6,259,856 B1 | 7/2001 | Shahid |
| 6,271,484 B1 | 8/2001 | Tokutsu |
| 6,278,829 B1 | 8/2001 | BuAbbud et al. |
| 6,287,018 B1 | 9/2001 | Andrews et al. |
| 6,293,710 B1 | 9/2001 | Lampert et al. |
| 6,296,398 B1 | 10/2001 | Lu |
| 6,318,903 B1 | 11/2001 | Andrews et al. |
| 6,325,547 B1 | 12/2001 | Cammons et al. |
| 6,325,549 B1 | 12/2001 | Shevchuk |
| RE37,489 E | 1/2002 | Anton et al. |
| 6,347,888 B1 | 2/2002 | Puetz |
| 6,356,697 B1 | 3/2002 | Braga et al. |
| 6,357,934 B1 | 3/2002 | Driscoll et al. |
| 6,363,200 B1 | 3/2002 | Thompson et al. |
| 6,364,685 B1 | 4/2002 | Manning |
| 6,367,984 B1 | 4/2002 | Stephenson et al. |
| 6,385,381 B1 | 5/2002 | Janus et al. |
| 6,409,392 B1 | 6/2002 | Lampert et al. |
| 6,411,767 B1 | 6/2002 | Burrous et al. |
| 6,418,262 B1 | 7/2002 | Puetz et al. |
| 6,419,402 B1 | 7/2002 | Zimmel |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,443,627 B1 | 9/2002 | Anderson et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| 6,471,416 B2 | 10/2002 | Lu |
| D466,087 S | 11/2002 | Cuny et al. |
| 6,480,487 B1 | 11/2002 | Wegleitner et al. |
| 6,483,977 B2 | 11/2002 | Battey et al. |
| 6,496,640 B1 | 12/2002 | Harvey et al. |
| 6,504,988 B1 | 1/2003 | Trebesch et al. |
| 6,508,593 B1 | 1/2003 | Farnsworth et al. |
| 6,511,230 B1 | 1/2003 | Connelly et al. |
| 6,532,332 B2 | 3/2003 | Solheid et al. |
| 6,535,682 B1 | 3/2003 | Puetz et al. |
| 6,539,147 B1 | 3/2003 | Mahony |
| 6,539,160 B2 | 3/2003 | Battey et al. |

(56) References Cited

U.S. PATENT DOCUMENTS

| | | |
|---|---|---|
| 6,542,688 B1 | 4/2003 | Battey et al. |
| 6,550,979 B1 | 4/2003 | Fleenor et al. |
| 6,554,485 B1 | 4/2003 | Beatty et al. |
| 6,556,763 B1 | 4/2003 | Puetz et al. |
| 6,565,262 B2 | 5/2003 | Childers et al. |
| 6,577,595 B1 | 6/2003 | Counterman |
| 6,588,938 B1 | 7/2003 | Lampert et al. |
| 6,591,051 B2 | 7/2003 | Solheid et al. |
| 6,597,670 B1 | 7/2003 | Tweedy et al. |
| 6,619,856 B1 | 9/2003 | Lampert et al. |
| 6,621,975 B2 | 9/2003 | Laporte et al. |
| 6,623,170 B2 | 9/2003 | Petrillo |
| 6,625,375 B1 | 9/2003 | Mahony |
| 6,629,782 B2 | 10/2003 | McPhee et al. |
| 6,631,237 B2 | 10/2003 | Knudsen et al. |
| RE38,311 E | 11/2003 | Wheeler |
| 6,652,155 B2 | 11/2003 | Lampert |
| 6,654,536 B2 | 11/2003 | Battey et al. |
| 6,661,961 B1 | 12/2003 | Allen et al. |
| 6,663,292 B1 | 12/2003 | Shirakawa |
| 6,663,293 B2 | 12/2003 | Lampert et al. |
| 6,668,127 B1 | 12/2003 | Mahony |
| 6,672,774 B2 | 1/2004 | Theuerkorn et al. |
| 6,672,898 B2 | 1/2004 | Kahle et al. |
| 6,678,457 B2 | 1/2004 | Kim et al. |
| 6,695,487 B2 | 2/2004 | Kobayashi et al. |
| 6,705,765 B2 | 3/2004 | Lampert et al. |
| 6,705,768 B2 | 3/2004 | Serizawa |
| 6,712,523 B2 | 3/2004 | Zimmel |
| 6,722,790 B2 | 4/2004 | Caveney |
| 6,752,538 B1 | 6/2004 | Bates, III |
| 6,755,574 B2 | 6/2004 | Fujiwara et al. |
| 6,760,530 B1 | 7/2004 | Mandry |
| 6,760,531 B1 | 7/2004 | Solheid et al. |
| 6,768,860 B2 | 7/2004 | Liberty |
| 6,778,752 B2 | 8/2004 | Laporte et al. |
| 6,788,786 B1 | 9/2004 | Kessler et al. |
| 6,789,954 B2 | 9/2004 | Lampert et al. |
| 6,792,190 B2 | 9/2004 | Xin |
| 6,792,191 B1 | 9/2004 | Clapp, Jr. et al. |
| 6,799,898 B2 | 10/2004 | Cheng et al. |
| 6,815,612 B2 | 11/2004 | Bloodworth et al. |
| 6,817,780 B2 | 11/2004 | Ngo |
| 6,848,836 B2 | 2/2005 | Ueda et al. |
| 6,850,685 B2 | 2/2005 | Tinucci et al. |
| 6,853,795 B2 | 2/2005 | Dagley et al. |
| 6,859,604 B2 | 2/2005 | Marrs |
| 6,870,734 B2 | 3/2005 | Mertesdorf et al. |
| 6,872,008 B2 * | 3/2005 | Takeda ............... G02B 6/3825 385/60 |
| 6,901,200 B2 | 5/2005 | Schray |
| 6,909,833 B2 | 6/2005 | Henschel et al. |
| 6,910,807 B2 | 6/2005 | Lu |
| 6,913,396 B2 | 7/2005 | Nelson |
| 6,916,120 B2 | 7/2005 | Zimmel et al. |
| 6,918,704 B2 | 7/2005 | Marrs et al. |
| 6,920,274 B2 | 7/2005 | Rapp et al. |
| 6,925,241 B2 | 8/2005 | Bohle et al. |
| 6,950,593 B2 | 9/2005 | Hodge et al. |
| 6,980,725 B1 | 12/2005 | Swieconek |
| 6,983,095 B2 | 1/2006 | Reagan et al. |
| 6,984,074 B2 | 1/2006 | Makhlin et al. |
| 7,018,108 B2 | 3/2006 | Makhlin et al. |
| 7,029,322 B2 | 4/2006 | Ernst et al. |
| 7,088,899 B2 | 8/2006 | Reagan et al. |
| 7,103,255 B2 | 9/2006 | Reagan |
| 7,104,702 B2 | 9/2006 | Barnes et al. |
| 7,118,288 B2 | 10/2006 | Lu |
| 7,121,165 B2 | 10/2006 | Yamakawa |
| 7,142,764 B2 | 11/2006 | Allen et al. |
| 7,146,089 B2 | 12/2006 | Reagan et al. |
| 7,171,102 B2 | 1/2007 | Reagan et al. |
| 7,198,409 B2 | 4/2007 | Smith et al. |
| 7,200,317 B2 | 4/2007 | Reagan et al. |
| 7,201,518 B2 | 4/2007 | Holmquist |
| 7,204,644 B2 | 4/2007 | Barnes et al. |
| 7,218,827 B2 | 5/2007 | Vongseng et al. |
| 7,233,731 B2 | 6/2007 | Solheid et al. |
| 7,234,877 B2 | 6/2007 | Sedor |
| 7,246,950 B2 | 7/2007 | Lu |
| 7,258,493 B2 | 8/2007 | Milette |
| 7,277,620 B2 | 10/2007 | Vongseng et al. |
| 7,281,859 B2 | 10/2007 | Mudd et al. |
| 7,283,718 B2 | 10/2007 | Zaina et al. |
| 7,369,741 B2 | 5/2008 | Reagan et al. |
| 7,376,323 B2 | 5/2008 | Zimmel |
| 7,377,697 B2 | 5/2008 | Kahle et al. |
| 7,384,201 B2 | 6/2008 | Lu |
| 7,387,447 B2 | 6/2008 | Mudd et al. |
| 7,390,203 B2 | 6/2008 | Murano et al. |
| 7,400,813 B2 | 7/2008 | Zimmel |
| 7,400,816 B2 | 7/2008 | Reagan et al. |
| 7,407,330 B2 | 8/2008 | Smith et al. |
| 7,416,349 B2 | 8/2008 | Kramer |
| 7,471,869 B2 | 12/2008 | Reagan et al. |
| 7,473,037 B2 | 1/2009 | Robertson et al. |
| 7,503,702 B2 | 3/2009 | Lu |
| 7,515,805 B2 | 4/2009 | Vongseng et al. |
| 7,519,259 B2 | 4/2009 | Smith et al. |
| 7,534,115 B2 | 5/2009 | Murano et al. |
| 7,583,883 B2 | 9/2009 | Kowalczyk et al. |
| 7,641,398 B2 | 1/2010 | O'Riorden et al. |
| 7,654,749 B2 | 2/2010 | Lu |
| 7,658,551 B1 | 2/2010 | Wu et al. |
| 7,674,046 B2 | 3/2010 | Milette |
| 7,690,848 B2 | 4/2010 | Faika et al. |
| 7,712,970 B1 | 5/2010 | Lee |
| 7,862,243 B2 | 1/2011 | Kahle et al. |
| 7,874,738 B2 | 1/2011 | Lu |
| 8,123,415 B2 | 2/2012 | Kahle et al. |
| 8,186,890 B2 | 5/2012 | Lu |
| 8,313,248 B2 | 11/2012 | Kahle et al. |
| 8,382,382 B2 | 2/2013 | Nelson |
| 8,457,503 B2 | 6/2013 | Akiyama |
| 8,636,422 B2 | 1/2014 | Kahle et al. |
| 8,845,205 B2 | 9/2014 | Nelson |
| 9,146,362 B2 | 9/2015 | Marcouiller et al. |
| 9,256,033 B2 | 2/2016 | Nielson |
| 9,835,808 B2 | 12/2017 | Nielson |
| 2001/0001270 A1 | 5/2001 | Williams Vigliaturo |
| 2002/0034290 A1 | 3/2002 | Pershan |
| 2002/0131722 A1 | 9/2002 | Lampert et al. |
| 2002/0166227 A1 | 11/2002 | Holland et al. |
| 2002/0176681 A1 | 11/2002 | Puetz et al. |
| 2002/0181893 A1 | 12/2002 | White et al. |
| 2002/0197018 A1 | 12/2002 | Lampert |
| 2003/0002812 A1 | 1/2003 | Lampert |
| 2003/0007767 A1 | 1/2003 | Douglas et al. |
| 2003/0095772 A1 | 5/2003 | Solheid et al. |
| 2003/0113086 A1 | 6/2003 | Jun et al. |
| 2003/0147597 A1 | 8/2003 | Duran |
| 2003/0156797 A1 | 8/2003 | Gheradini |
| 2003/0161586 A1 | 8/2003 | Hirabayashi |
| 2003/0174996 A1 | 9/2003 | Henschel et al. |
| 2003/0207601 A1 | 11/2003 | Adachi |
| 2003/0223703 A1 | 12/2003 | Chen et al. |
| 2003/0231836 A1 | 12/2003 | Robertson et al. |
| 2003/0231838 A1 | 12/2003 | Takeda et al. |
| 2004/0052474 A1 | 3/2004 | Lampert et al. |
| 2004/0074852 A1 | 4/2004 | Knudsen et al. |
| 2004/0126069 A1 | 7/2004 | Jong et al. |
| 2004/0151437 A1 | 8/2004 | Marrs et al. |
| 2004/0163238 A1 | 8/2004 | Holliday |
| 2004/0165852 A1 | 8/2004 | Erwin et al. |
| 2004/0228598 A1 | 11/2004 | Allen et al. |
| 2004/0247252 A1 | 12/2004 | Ehrenreich et al. |
| 2004/0264873 A1 | 12/2004 | Smith et al. |
| 2004/0264875 A1 | 12/2004 | Makhlin et al. |
| 2004/0264877 A1 | 12/2004 | Makhlin et al. |
| 2005/0002633 A1 | 1/2005 | Solheid et al. |
| 2005/0018973 A1 | 1/2005 | Loder |
| 2005/0036744 A1 | 2/2005 | Caveney et al. |
| 2005/0074211 A1 | 4/2005 | Greub |
| 2005/0117850 A1 | 6/2005 | Milette |

(56) References Cited

U.S. PATENT DOCUMENTS

| | | |
|---|---|---|
| 2005/0129379 A1 | 6/2005 | Reagan et al. |
| 2005/0135753 A1 | 6/2005 | Eigenmann et al. |
| 2005/0147358 A1 | 7/2005 | Zaina et al. |
| 2005/0163448 A1 | 7/2005 | Blackwell, Jr. et al. |
| 2005/0213890 A1 | 9/2005 | Barnes et al. |
| 2005/0213892 A1 | 9/2005 | Barnes et al. |
| 2005/0213897 A1 | 9/2005 | Palmer et al. |
| 2006/0002662 A1 | 1/2006 | Manning et al. |
| 2006/0018604 A1 | 1/2006 | Bareel et al. |
| 2006/0083475 A1 | 4/2006 | Grubish et al. |
| 2006/0089049 A1 | 4/2006 | Sedor |
| 2006/0093274 A1 | 5/2006 | Kahle et al. |
| 2006/0093301 A1 | 5/2006 | Zimmel |
| 2006/0115219 A1 | 6/2006 | Mudd et al. |
| 2006/0115220 A1 | 6/2006 | Elkins, II et al. |
| 2006/0154529 A1 | 7/2006 | Erdman et al. |
| 2006/0204200 A1 | 9/2006 | Lampert et al. |
| 2006/0269194 A1 | 11/2006 | Luther et al. |
| 2007/0098331 A1 | 5/2007 | Mudd et al. |
| 2007/0223863 A1 | 9/2007 | Robertson et al. |
| 2007/0280599 A1 | 12/2007 | Faika et al. |
| 2008/0008436 A1 | 1/2008 | Reagan et al. |
| 2008/0013889 A1 | 1/2008 | Milette |
| 2008/0013910 A1 | 1/2008 | Reagan et al. |
| 2008/0019644 A1 | 1/2008 | Smith et al. |
| 2008/0019655 A1 | 1/2008 | Vongseng et al. |
| 2008/0025684 A1 | 1/2008 | Vongseng et al. |
| 2008/0069501 A1 | 3/2008 | Mudd et al. |
| 2008/0075411 A1 | 3/2008 | Solheid et al. |
| 2008/0175540 A1 | 7/2008 | Zheng et al. |
| 2008/0175545 A1 | 7/2008 | Zheng et al. |
| 2008/0226236 A1 | 9/2008 | Pepin et al. |
| 2008/0260332 A1 | 10/2008 | Murano et al. |
| 2008/0317413 A1 | 12/2008 | Faika et al. |
| 2008/0317425 A1 | 12/2008 | Smith et al. |
| 2009/0074372 A1 | 3/2009 | Solheid et al. |
| 2009/0087157 A1 | 4/2009 | Smith et al. |
| 2009/0190896 A1 | 7/2009 | Smith et al. |
| 2009/0196565 A1 | 8/2009 | Vongseng et al. |
| 2009/0214164 A1 | 8/2009 | Nakagawa |
| 2009/0285541 A1 | 11/2009 | Kowalczyk et al. |
| 2009/0290839 A1 | 11/2009 | Lin et al. |
| 2010/0054668 A1 | 3/2010 | Nelson |
| 2010/0111484 A1 | 5/2010 | Allen |
| 2011/0229082 A1 | 9/2011 | Kahle et al. |
| 2013/0071066 A1 | 3/2013 | Lu |
| 2013/0177279 A1 | 7/2013 | Nelson |
| 2013/0183018 A1 | 7/2013 | Holmberg |
| 2014/0082913 A1 | 3/2014 | Marcouiller et al. |
| 2014/0286608 A1 | 9/2014 | Kahle et al. |
| 2015/0013889 A1 | 1/2015 | Nelson |

FOREIGN PATENT DOCUMENTS

| | | |
|---|---|---|
| CA | 2403634 | 9/2002 |
| CN | 1250527 A | 4/2000 |
| CN | 2426610 | 4/2001 |
| CN | 1851510 A | 10/2006 |
| CN | 202771054 U | 3/2013 |
| CN | 203414633 U | 1/2014 |
| CN | 103984061 A | 8/2014 |
| CN | 204807747 U | 11/2015 |
| EP | 0 098 190 B1 | 9/1987 |
| EP | 0 597 501 | 5/1994 |
| EP | 0 689 069 | 12/1995 |
| EP | 0 731 369 | 9/1996 |
| EP | 0 743 701 | 11/1996 |
| EP | 0 762 558 | 3/1997 |
| EP | 0 788 002 | 8/1997 |
| EP | 0 871 047 | 10/1998 |
| EP | 0 967 498 | 12/1999 |
| EP | 0 975 180 | 1/2000 |
| EP | 1 045 267 | 10/2000 |
| EP | 1 443 350 | 8/2004 |
| EP | 1 486 808 | 12/2004 |
| JP | 63-229409 | 9/1988 |
| JP | 2000-266963 | 9/2000 |
| JP | 2001-33658 | 2/2001 |
| JP | 2001-188134 | 7/2001 |
| JP | 1-144266 | 6/2002 |
| JP | 3307618 | 7/2002 |
| JP | 2003-195113 A | 7/2003 |
| JP | 2005-345589 | 12/2005 |
| JP | 3761762 | 3/2006 |
| JP | 2010-230862 | 10/2010 |
| WO | 95/35520 | 12/1995 |
| WO | 98/53347 | 11/1998 |
| WO | 99/27404 | 6/1999 |
| WO | 00/75706 | 12/2000 |
| WO | 01/79904 | 10/2001 |
| WO | 02/21182 | 3/2002 |
| WO | 02/103429 | 12/2002 |
| WO | 03/093883 | 11/2003 |
| WO | 2004/032532 | 4/2004 |
| WO | 2005/101076 | 10/2005 |

OTHER PUBLICATIONS

ADC Telecommunications, Inc., technical drawings for "Retainer Staright [sic] Removable SC," which show a latch design, Jan. 17, 2006, 2 pages.

24 photos of LambdaUnite® Blank Card; "LambdaUnite® MultiService Switch (MSS)" brochure (2003); and "Lucent's LambdaUnite® Busts Out" official release, dated Jan. 29, 2002 (33 pages total).

ADC Telecommunications, Inc., brochure entitled "Value-Added Module System," Publication No. 891, 29 pages, dated Apr. 2000.

ADC Telecommunications, Inc., brochure entitled "Value-Added Module System: Optical Distribution Frame (OMX™ 600)," Publication No. 891-OMX, 11 pages, dated Jan. 2002.

ADC Telecommunications, Inc., brochure entitled "Fiber Panel Products, Second Edition," Publication No. 846, 116 pages, dated Jul. 1996.

ADC Telecommunications, Inc., brochure entitled "Secure Fiber Entrance Terminal (SFET)," Publication No. 1005, 8 pages, dated May 1998.

ADC Telecommunications, Inc. brochure entitled "Next Generation Frame (NGF) Product Family Ordering Guide, 6th Edition," Publication No. 820, 44 pages, dated Feb. 2003.

ADC Telecommunications, Inc. brochure entitled "Fiber Optic, Cable Assemblies and Accessories," Publication No. 100300, 26 pages, dated Apr. 2003.

ADC Telecommunications, Inc. brochure entitled "OMX™ 600 Optical Distribution Frame," Publication No. 854, front cover, table of contents, pp. 1-13, rear cover, dated Apr. 2000 (15 pages total).

ADC Telecommunications, Inc., brochure entitled "Outside Plant, Fiber Cross-Connect Solutions," Publication No. 1047, 51 pages, dated Jun. 2002.

AMP Inc. catalog entitled "Fiber Optic Products," front and back covers and p. 59, (Copyright 1991) (4 pages total).

AT&T Network Systems catalog entitled "Fiber Optic Products Innovation for wide ranging applications," front and back covers and pp. 6-1-6-16 (Copyright 1995) (18 pages total).

ATI Optique Division of TI electronique, "ATI Optique Catalog," Version 2.6, released Mar. 27, 2002 (50 pages).

Amphenol Corp., brochure entitled "Amphenol® 954 Series one piece SC Connector," F122-00311, Issue 1, 2 pages, dated Aug. 1990.

Alcoa Fujikura Ltd. brochure entitled "Couplers: Couplers WDMS Packaging,", 5 pages (Copyright 2000).

Drawings showing an ADC fiber storage trough concept including presentation entitled "Fujitsu Fiber Management Project Fiber Trough Concept," 11 pages (Jun. 2002).

Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).

(56) References Cited

OTHER PUBLICATIONS

FONS Corporation product sheet entitled "Modular Distribution Cabinets Rack Mount Enclosures," 2 pages (Copyright 2005).

Hirose Electric Co., Ltd. catalog entitled "Optical Fibre Connectors," Catalog No. O.F. (9) 3K, front and back covers and pp. 16-17, and 49, dated Mar. 1991 (5 pages total).

Iwano et al., "MU-type Optical Fiber Connector System," NTT Review, vol. 9, No. 2, pp. 63-71 (Mar. 1997).

Nexans, "Cross-Connect Cabinet III: Plastic Watertight Cabinet for FTTH Applications," 2 pages (Oct. 2002).

Nexans, "Cross-Connect Cabinet V: Metallic Watertight Cabinet for FTTH Applications," 2 pages (Oct. 2002).

NTT International brochure entitled "Fiber Termination Module (FTM) & Premises Optical Distribution Cabinets (PODC)," 3 pages, undated.

Optical fiber coupler review, Manufacturing Group at the Optoelectronics Division, Technical Report 2001, Products Presentation, showing Sumitomo Osaka Cement Co. Ltd's Optical Coupler (pp. 41-42).

Sugita et al., "SC-Type Single-Mode Optical Fiber Connectors," Journal of Lightwave Technology, vol. 7, No. 11, pp. 1689-1696 (Nov. 1989).

\* cited by examiner

ALIGNMENT SLEEVE ASSEMBLY AND FIBER OPTIC ADAPTER

This application is a National Stage Application of PCT/CN2016/082021, filed on 13 May 2016, which claims benefit of Serial No. 201510247621.4, filed on 15 May 2015 in China and Serial No. 201520319609.5, filed on 15 May 2015 in China and which applications are incorporated herein by reference. To the extent appropriate, a claim of priority is made to each of the above disclosed applications.

BACKGROUND OF THE INVENTION

Field of the Invention

The present invention relates to an alignment sleeve assembly and a fiber optic adapter comprising the alignment sleeve assembly.

Description of the Related Art

In the prior art, a fiber optic adapter (for convenience of description, herein take a single-fiber SC adapter as an example) generally comprises an alignment sleeve, a mating retainer for receiving the alignment sleeve therein and locking a pair of coupled fiber optic connectors, a housing, a buckle type fixing clamp spring and a warranty buckle (optional).

In the prior art, there is machining error in the alignment sleeve, for example, inner wall roundness of the alignment sleeve is not enough, and wall thickness of the alignment sleeve is not uniform. As a result, when ferrules of a pair of fiber optic connectors are inserted into the alignment sleeve of the fiber optic adapter from opposite ends of the alignment sleeve and coupled with each other, in addition to an alignment error, which will lead to a connection loss, between fiber cores of the coupled connectors, the alignment sleeve will also cause a certain alignment error, it will further increase the connection loss or increase the connection loss uncertainty. For an individual alignment sleeve, only when the alignment sleeve is located at a particular circumferential angle, the connection loss caused by it is minimal.

In the prior art, for batch manufacturing, the particular circumferential angle of each individual alignment sleeve corresponding to the minimum connection loss is apt to be different. Furthermore, the alignment sleeve is not positioned and fixed in the circumferential direction, and the alignment sleeve may rotate randomly. Therefore, minimizing the connection loss by positioned the alignment sleeve at the particular circumferential angle is not recognized and well utilized yet by the existing design.

As for the fiber optic adapter in the prior art, the alignment sleeve may freely rotate in the mating retainer along the circumferential direction and have a certain degree of freedom in three directions perpendicular to each other. Since the alignment sleeve has a certain tolerance, the connection loss of the coupled connectors has certain polarity. That is, only when the alignment sleeve is positioned at the particular circumferential angle, the coupled connectors may achieve the minimum insertion loss. However, in the prior art, the alignment sleeve may be rotated randomly. Thereby, the insertion loss of the entire optical fiber interconnection system is not always kept in a state of minimum loss. In other words, the random nature of the circumferential angle of the alignment sleeve affects the total insertion loss of the fiber interconnection system. Such situation does not meet strict requirements on ultra low insertion loss of optical fiber interconnection system in future and requirements on the repeatability of the ultra low insertion loss after the fiber optic connectors are decoupled.

SUMMARY OF THE INVENTION

The present invention has been made to overcome or alleviate at least one aspect of the above mentioned disadvantages.

According to an object of the present invention, there is provided an alignment sleeve assembly and a fiber optic adapter comprising the alignment sleeve assembly, in which an alignment sleeve may be adjusted to and fixed at a predetermined circumferential angle, at which the fiber optic insertion loss is minimal, with respect to a mating retainer. In this way, it improves the alignment accuracy of a pair of coupled fiber optic connectors.

According to an aspect of the present invention, there is provided a fiber optic adapter, comprising: a mating retainer; an alignment sleeve received in the mating retainer, wherein a ferrule of a fiber optic connector is adapted to be inserted into the alignment sleeve through an insertion port of the fiber optic adapter; and an adjustment element configured to adjust a circumferential angle of the alignment sleeve relative to the mating retainer to a predetermined circumferential angle and hold the alignment sleeve at the predetermined circumferential angle relative to the mating retainer.

According to an exemplary embodiment of the present invention, when the alignment sleeve is held at the predetermined circumferential angle relative to the mating retainer, an alignment error between fiber cores of fibers, inserted into the alignment sleeve of the fiber optic adapter, of a pair of fiber optic connectors is minimal.

According to another exemplary embodiment of the present invention, when the alignment sleeve is held at the predetermined circumferential angle relative to the mating retainer, a longitudinal slot in the alignment sleeve is positioned at a predetermined orientation.

According to another exemplary embodiment of the present invention, the adjustment element is adapted to be sleeved on the alignment sleeve, and a radial protrusion is formed on an inner wall of the adjustment element and adapted to be inserted into the longitudinal slot of the alignment sleeve, so that the alignment sleeve is capable of being rotated with the alignment element, and the circumferential angle of the alignment sleeve relative to the mating retainer is capable of being adjusted by rotating the adjustment element.

According to another exemplary embodiment of the present invention, when the radial protrusion of the adjustment element is inserted into the longitudinal slot of the alignment sleeve, the alignment sleeve is unable to be rotated in a circumferential direction relative to the adjustment element.

According to another exemplary embodiment of the present invention, when the radial protrusion of the adjustment element is inserted into the longitudinal slot of the alignment sleeve, the alignment sleeve is only able to be rotated in a range of ±30 degrees in a circumferential direction relative to the adjustment element.

According to another exemplary embodiment of the present invention, when the radial protrusion of the adjustment element is inserted into the longitudinal slot of the alignment sleeve, the alignment sleeve is only able to be rotated in a range of ±20 degrees in a circumferential direction relative to the adjustment element.

According to another exemplary embodiment of the present invention, when the radial protrusion of the adjustment element is inserted into the longitudinal slot of the alignment sleeve, the alignment sleeve is only able to be rotated in a range of ±10 degrees in a circumferential direction relative to the adjustment element.

According to another exemplary embodiment of the present invention, the adjustment element is formed as a polygonal prism with a polygon cross section; a positioning slot, corresponding to an outer profile of the adjustment element, is formed in the mating retainer; the adjustment element is adapted to be fixed in the positioning slot of the mating retainer, so as to hold the alignment sleeve at the predetermined circumferential angle relative to the mating retainer.

According to another exemplary embodiment of the present invention, the adjustment element is formed with multiple spline keys, and the mating retainer is formed with multiple spline slots; the multiple spline keys of the adjustment element are adapted to be fitted in the multiple spline slots of the mating retainer, so as to hold the alignment sleeve at the predetermined circumferential angle relative to the mating retainer.

According to another exemplary embodiment of the present invention, a first circumferential angle mark is provided on an outer surface of the adjustment element, and a second circumferential angle mark is provided on the mating retainer; when the alignment sleeve is adjusted to the predetermined circumferential angle by the adjustment element, the first circumferential angle mark of the adjustment element is aligned with the second circumferential angle mark of the mating retainer.

According to another exemplary embodiment of the present invention, the fiber optic adapter further comprises a housing in which the mating retainer are mounted; an alignment slot, configured to mate with a sliding block on the fiber optic connector, is formed in the housing, so as to ensure the fiber optic connector is inserted into the fiber optic adapter in a correct orientation relative to the fiber optic adapter.

According to another exemplary embodiment of the present invention, when the alignment sleeve is adjusted to the predetermined circumferential angle by the adjustment element, the first circumferential angle mark and the second circumferential angle mark are aligned with the alignment slot of the housing.

According to another exemplary embodiment of the present invention, the second circumferential angle mark of the mating retainer comprises a notch formed in the mating retainer; an foolproof assembly protrusion, configured to mate with the notch of the mating retainer, is formed on an inner wall of the housing; and the retainer is able to be assembled into the housing only when the foolproof assembly protrusion of the housing is aligned with the notch of the mating retainer.

According to another exemplary embodiment of the present invention, the fiber optic adapter further comprises a fixation element adapted to be mounted on the housing and hold a tube-like body of the mating retainer, so as to prevent the mating retainer from being pulled out of the housing.

According to another exemplary embodiment of the present invention, the fiber optic adapter further comprises an elastic snapper mounted on the housing and configured to lock the fiber optic adapter in a fixation installation position.

According to another exemplary embodiment of the present invention, the mating retainer comprises a first mating retainer and a second mating retainer capable of being assembled together.

According to another exemplary embodiment of the present invention, the positioning slot comprises a first positioning slot and a second positioning slot, aligned to each other, formed in mating ends of the first mating retainer and the second mating retainer, respectively.

According to another exemplary embodiment of the present invention, the second circumferential angle mark comprises a first notch and a second notch, aligned to each other, formed in the mating ends of the first mating retainer and the second mating retainer, respectively.

According to another exemplary embodiment of the present invention, the fiber optic adapter is adapted to interconnect one or more pairs of fiber optic connectors at the same time; one or more alignment sleeves, configured to align ferrules of one or more pairs of fiber optic connectors, are received in the retainer.

According to another aspect of the present invention, there is provided an alignment sleeve assembly, comprising: an alignment sleeve adapted to be received in a mating retainer of a fiber optic adapter; and an adjustment element configured to adjust a circumferential angle of the alignment sleeve relative to the mating retainer to a predetermined circumferential angle and hold the alignment sleeve at the predetermined circumferential angle relative to the mating retainer.

According to an exemplary embodiment of the present invention, the adjustment element is adapted to be sleeved on the alignment sleeve, and a radial protrusion is formed on an inner wall of the adjustment element and adapted to be inserted into the longitudinal slot of the alignment sleeve, so that the alignment sleeve is capable of being rotated with the alignment element, and the circumferential angle of the alignment sleeve relative to the mating retainer is capable of being adjusted by rotating the adjustment element.

According to another exemplary embodiment of the present invention, when the radial protrusion of the adjustment element is inserted into the longitudinal slot of the alignment sleeve, the alignment sleeve is unable to be rotated in a circumferential direction relative to the adjustment element.

According to another exemplary embodiment of the present invention, when the radial protrusion of the adjustment element is inserted into the longitudinal slot of the alignment sleeve, the alignment sleeve is only able to be rotated in a range of ±30 degrees in a circumferential direction relative to the adjustment element.

According to another exemplary embodiment of the present invention, when the radial protrusion of the adjustment element is inserted into the longitudinal slot of the alignment sleeve, the alignment sleeve is only able to be rotated in a range of ±20 degrees in a circumferential direction relative to the adjustment element.

According to another exemplary embodiment of the present invention, when the radial protrusion of the adjustment element is inserted into the longitudinal slot of the alignment sleeve, the alignment sleeve is only able to be rotated in a range of ±10 degrees in a circumferential direction relative to the adjustment element.

According to another exemplary embodiment of the present invention, the adjustment element is formed as a polygonal prism with a polygon cross section;

According to another exemplary embodiment of the present invention, a first circumferential angle mark, configured to identify the predetermined circumferential angle of the alignment sleeve relative to the mating retainer, is provided on an outer surface of the adjustment element.

In the above various exemplary embodiments of the present invention, the adjustment element is constructed to adjust the circumferential angle of the alignment sleeve with respect to the mating retainer to the predetermined circumferential angle, for example, at which the fiber insertion loss of the coupled connectors is minimal, and hold the alignment sleeve at the predetermined circumferential angle. In this way, it may improve the alignment accuracy of the coupled connectors.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
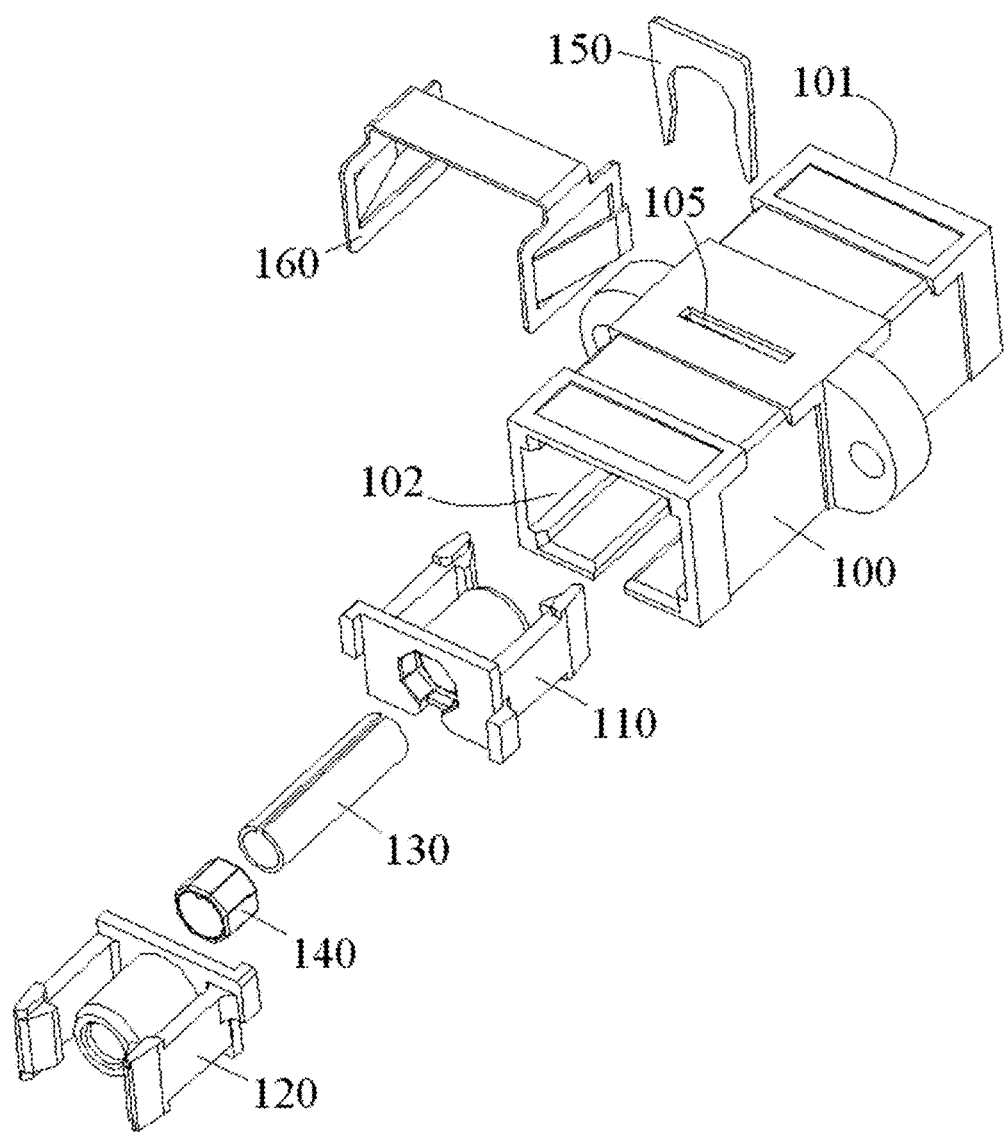
FIG. 1 is an illustrative exploded view of a fiber optic adapter according to a first exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a fiber optic adapter, comprising: a mating retainer; an alignment sleeve received in the mating retainer, a ferrule of a fiber optic connector being adapted to be inserted into the alignment sleeve through an insertion port of the fiber optic adapter; and an adjustment element configured to adjust a circumferential angle of the alignment sleeve relative to the mating retainer to a predetermined circumferential angle and hold the alignment sleeve at the predetermined circumferential angle relative to the mating retainer.

According to another general concept of the present invention, there is provided an alignment sleeve assembly, comprising: an alignment sleeve adapted to be received in a mating retainer of a fiber optic adapter; and an adjustment element configured to adjust a circumferential angle of the alignment sleeve relative to the mating retainer to a predetermined circumferential angle and hold the alignment sleeve at the predetermined circumferential angle relative to the mating retainer.

First Embodiment

FIGS. 1-13 show a fiber optic adapter according to a first exemplary embodiment of the present invention.

FIG. 1 is an illustrative exploded view of the fiber optic adapter according to a first exemplary embodiment of the present invention.

As shown in FIG. 1, it shows a LC type of fiber optic adapter. The fiber optic adapter mainly comprises a housing 100, a mating retainer 110, 120, an alignment sleeve 130 and an adjustment element 140.

As shown in FIG. 1, the mating retainer 110, 120 comprises a first mating retainer 110 and a second mating retainer 120 capable of being assembled together. The mating retainer 110, 120 is configured to receive the alignment sleeve 130 therein and lock coupled fiber optic connectors (not shown) in place. A ferrule of one of the fiber optic connector is adapted to be inserted into the alignment sleeve 130 through an insertion port 101, 102 of the fiber optic adapter. In this way, fiber cores of the fiber optic connectors are coupled with each other in the alignment sleeve 130.

Figure 2:
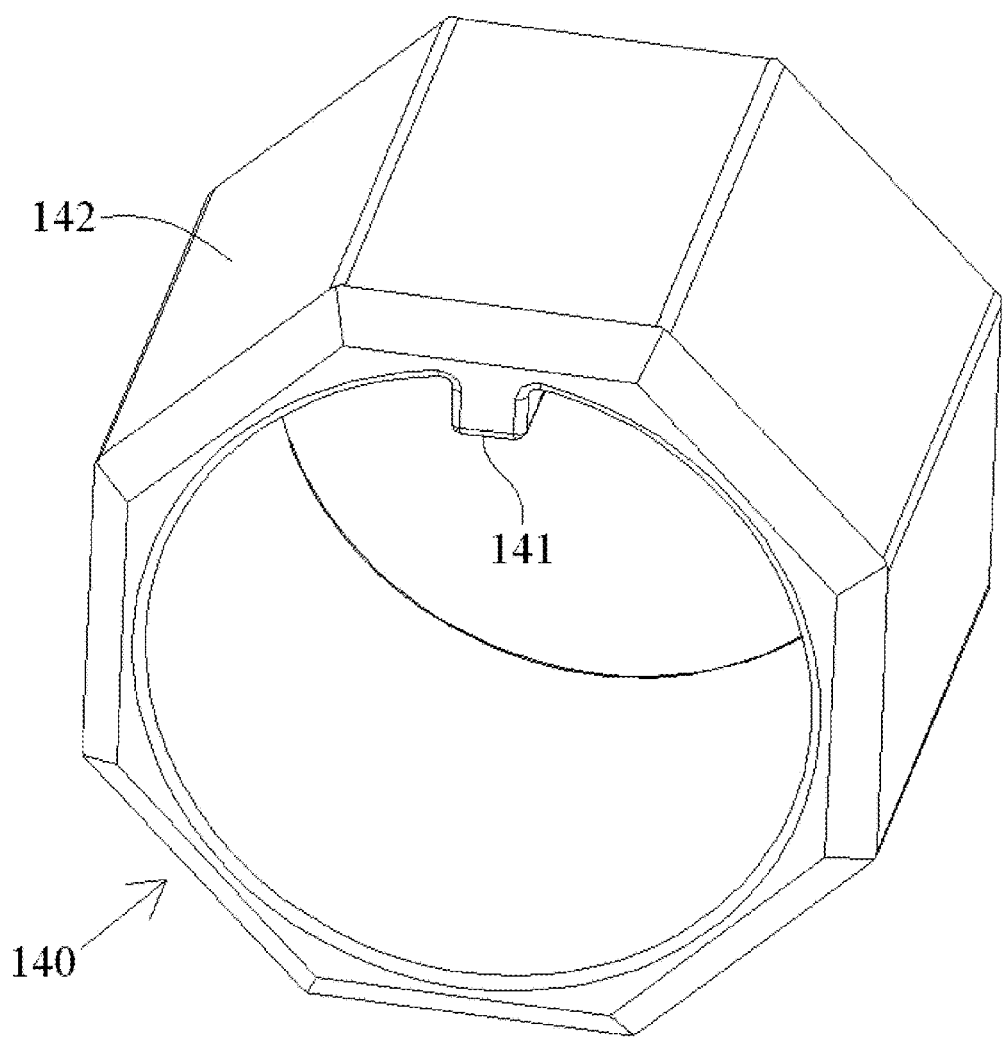
FIG. 2 is an illustrative perspective view of an adjustment element of the fiber optic adapter of FIG. 1.
Figure 3:
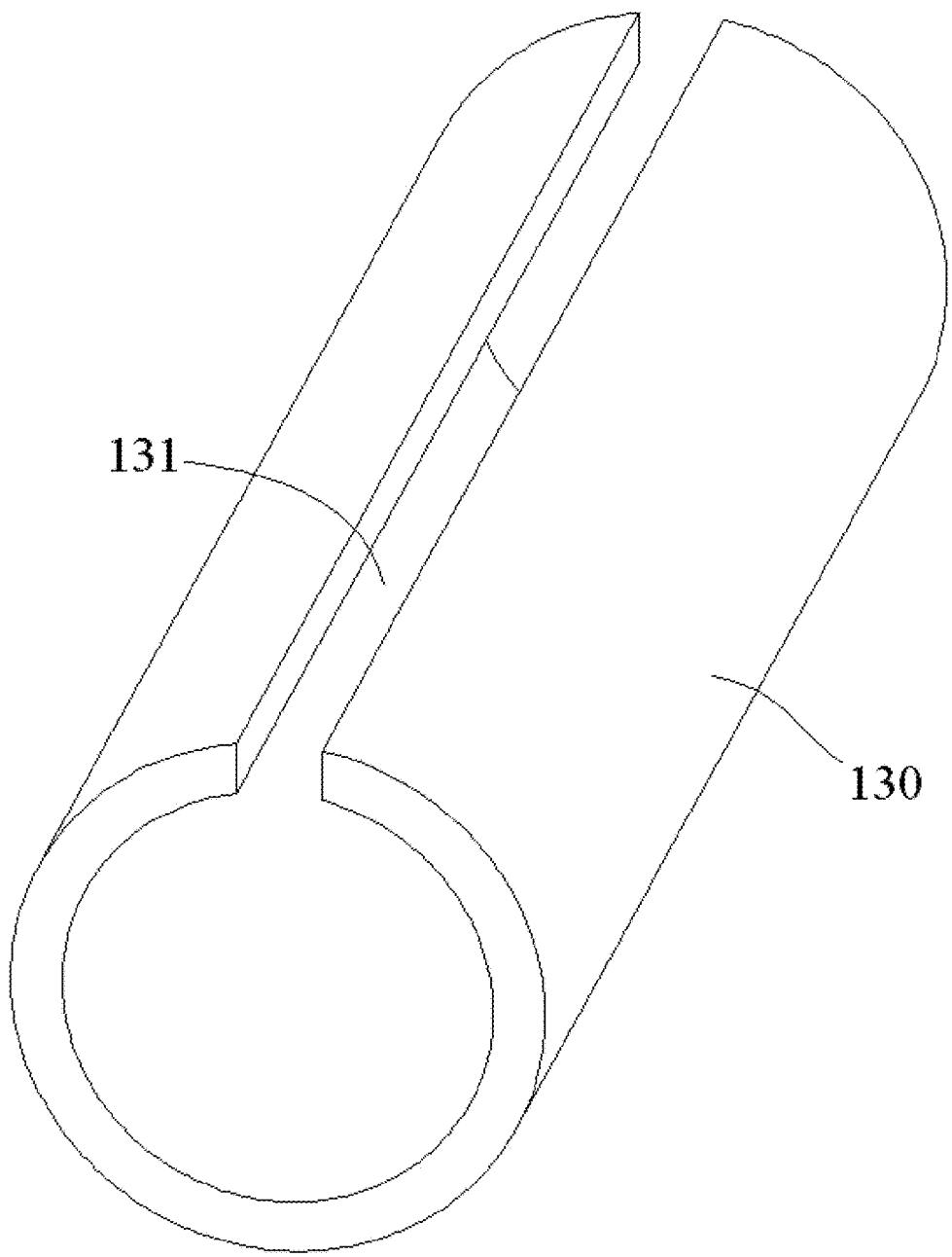
FIG. 3 is an illustrative perspective view of an alignment sleeve of the fiber optic adapter of FIG. 1.
Figure 4:
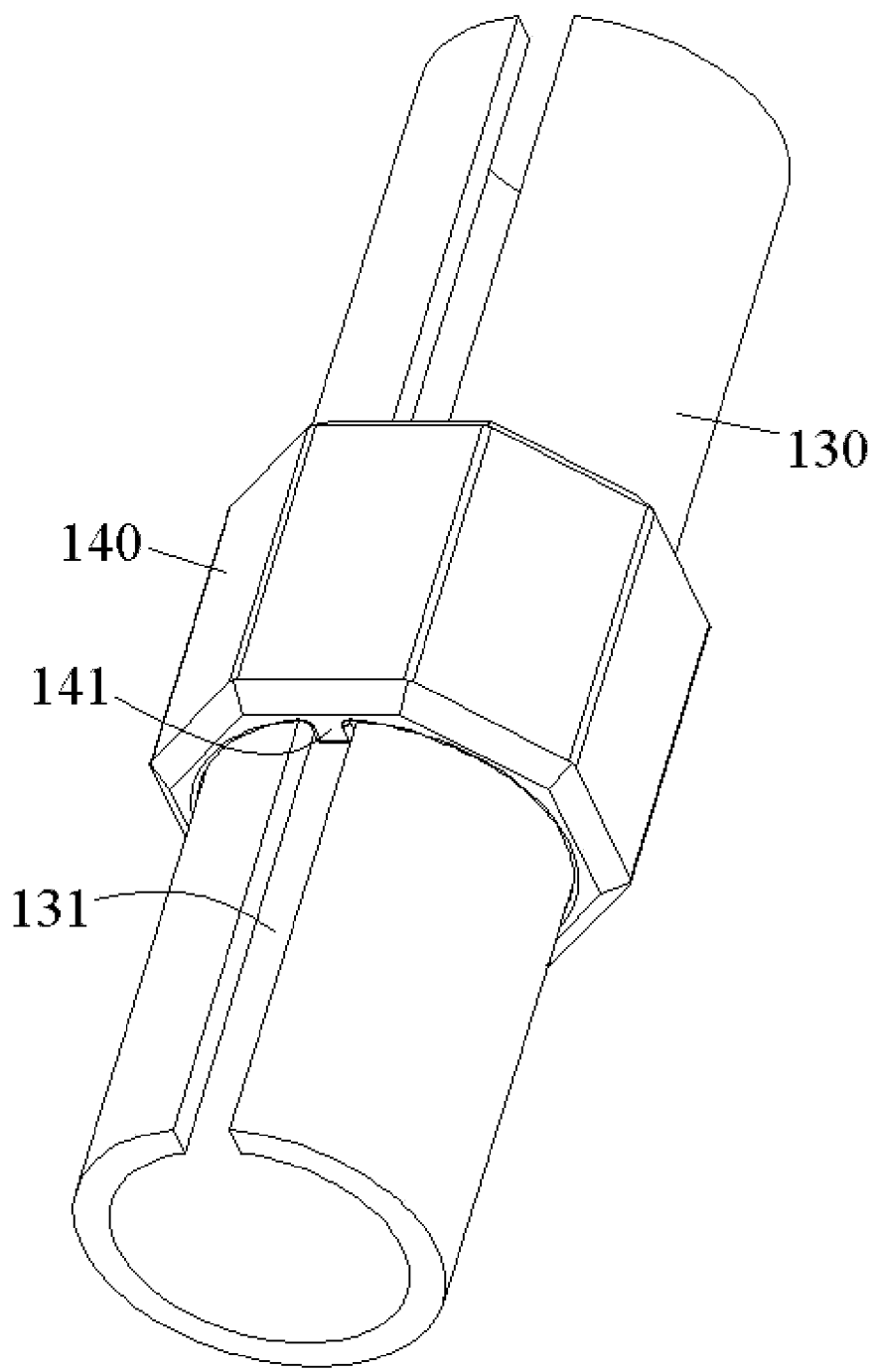
FIG. 4 is an illustrative view of an alignment sleeve assembly formed by assembling the adjustment element of FIG. 2 to the alignment sleeve of FIG. 3.

FIG. 2 is an illustrative perspective view of an adjustment element 140 of the fiber optic adapter of FIG. 1; FIG. 3 is an illustrative perspective view of an alignment sleeve 130 of the fiber optic adapter of FIG. 1; FIG. 4 is an illustrative view of an alignment sleeve assembly formed by assembling the adjustment element 140 of FIG. 2 to the alignment sleeve 130 of FIG. 3.

As shown in FIGS. 1-4, in an embodiment, the adjustment element 140 is configured to adjust a circumferential angle of the alignment sleeve 130 relative to the mating retainer 110, 120 to a predetermined circumferential angle and hold the alignment sleeve 130 at the predetermined circumferential angle relative to the mating retainer 110, 120.

In an embodiment, when the alignment sleeve 130 is held at the predetermined circumferential angle relative to the mating retainer 110, 120, an alignment error between fiber cores of fibers, which are inserted into the alignment sleeve 130 fiber optic adapter, of a pair of fiber optic connectors is minimal, that is, an insertion loss is minimal. In this way, it is possible to minimize the insertion loss of the fiber optic connectors by adjusting and positioning the circumferential angle of the alignment sleeve 130 with respect to the mating retainer 110, 120.

In the first embodiment shown in FIGS. 1-13, only a single alignment sleeve 130 is received in the mating retainer 110, 120. The alignment sleeve 130 is configured to align ferrules of the pair of fiber optic connectors to be coupled. Thereby, the fiber optic adapter of FIG. 1 is adapted to couple only a pair of fiber optic connectors at the same time. However, the present invention is not limited to this; the fiber optic adapter may be configured to couple a plurality of pairs of fiber optic connectors at the same time.

Hereafter, it will describe in detail features and assembling operation of components of the optical fiber adapter with reference to drawings.

As shown in FIGS. 2-4, in an embodiment, the adjustment element 140 is adapted to be sleeved on the alignment sleeve 130. A radial protrusion 141 is formed on an inner wall of the adjustment element 140 and adapted to be inserted into a longitudinal slot 131 of the alignment sleeve 130, so that the alignment sleeve 130 is capable of being rotated with the alignment element 140, and the circumferential angle of the alignment sleeve 130 relative to the mating retainer 110, 120 is adjusted by rotating the adjustment element 140.

In an exemplary embodiment of the present invention, the radial protrusion 141 of the adjustment element 140 has a width in a circumferential direction equal to or slightly less than a width of the longitudinal slot 131 of the alignment sleeve 130 in the circumferential direction. In this way, once the radial protrusion 141 of the adjustment element 140 is inserted into the longitudinal slot 131 of the alignment sleeve 130, the alignment sleeve 130 is unable to be rotated in a circumferential direction relative to the adjustment element 140, or is only able to be rotated in a very small angle range in the circumferential direction relative to the adjustment element 140, for example, is only able to be rotated in a range of ±30 degrees, preferably, in a range of ±20 degrees, more preferably, in a range of ±10 degrees.

Figure 5:
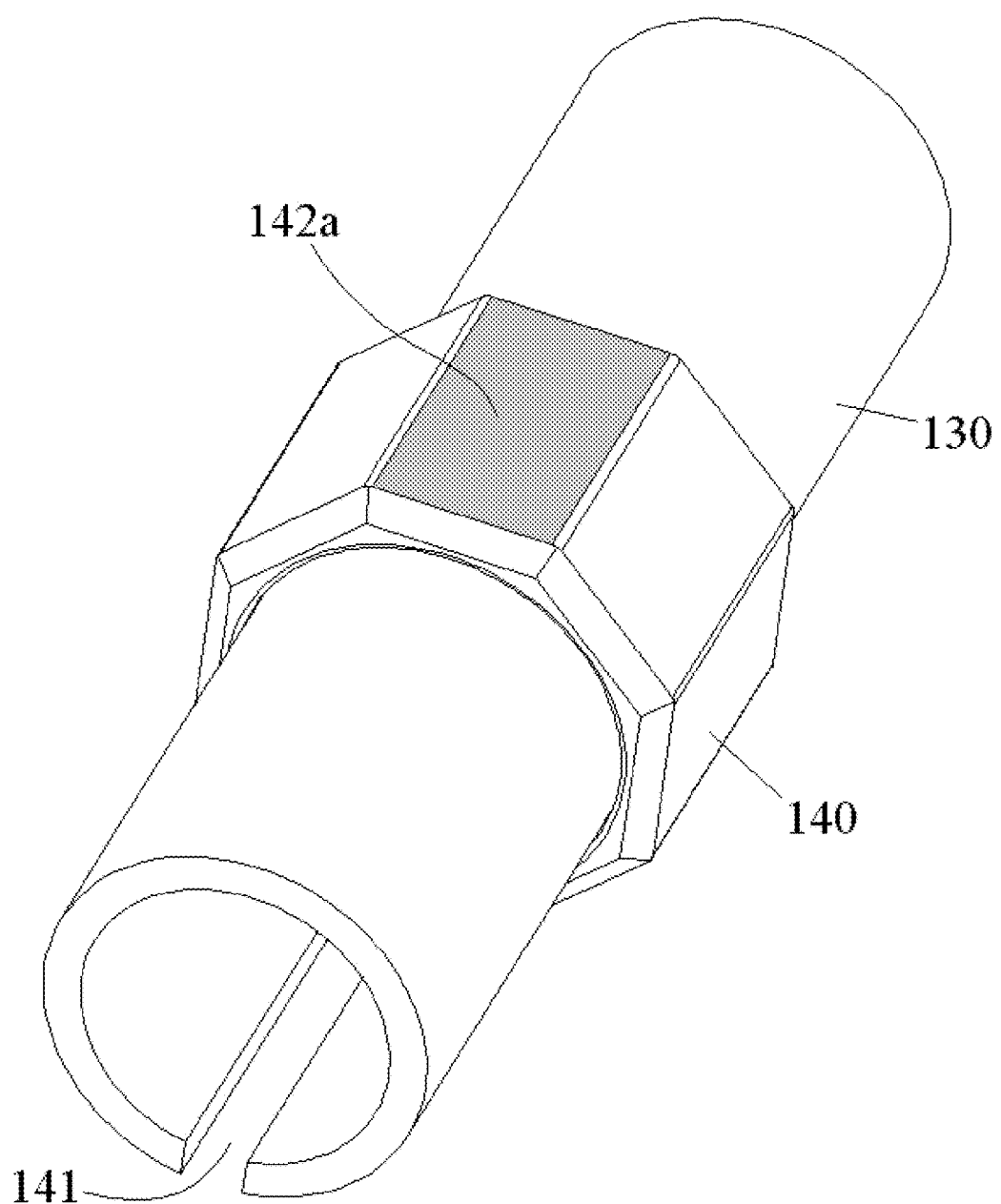
FIG. 5 is an illustrative view of a first circumferential angle mark formed on an outer surface of the adjustment element of the alignment sleeve assembly of FIG. 4.

FIG. 5 is an illustrative view of a first circumferential angle mark 142a formed on an outer surface of the adjustment element 140 of the alignment sleeve assembly of FIG. 4.

As shown in FIGS. 4 and 5, in an embodiment, before the alignment sleeve 130 is mounted to the mating retainer 110, 120, the alignment sleeve 130 is adjusted to the optimum circumferential angle, at which the insertion loss of the optical fiber connectors is minimal, by the adjustment element 140.

Figure 6:
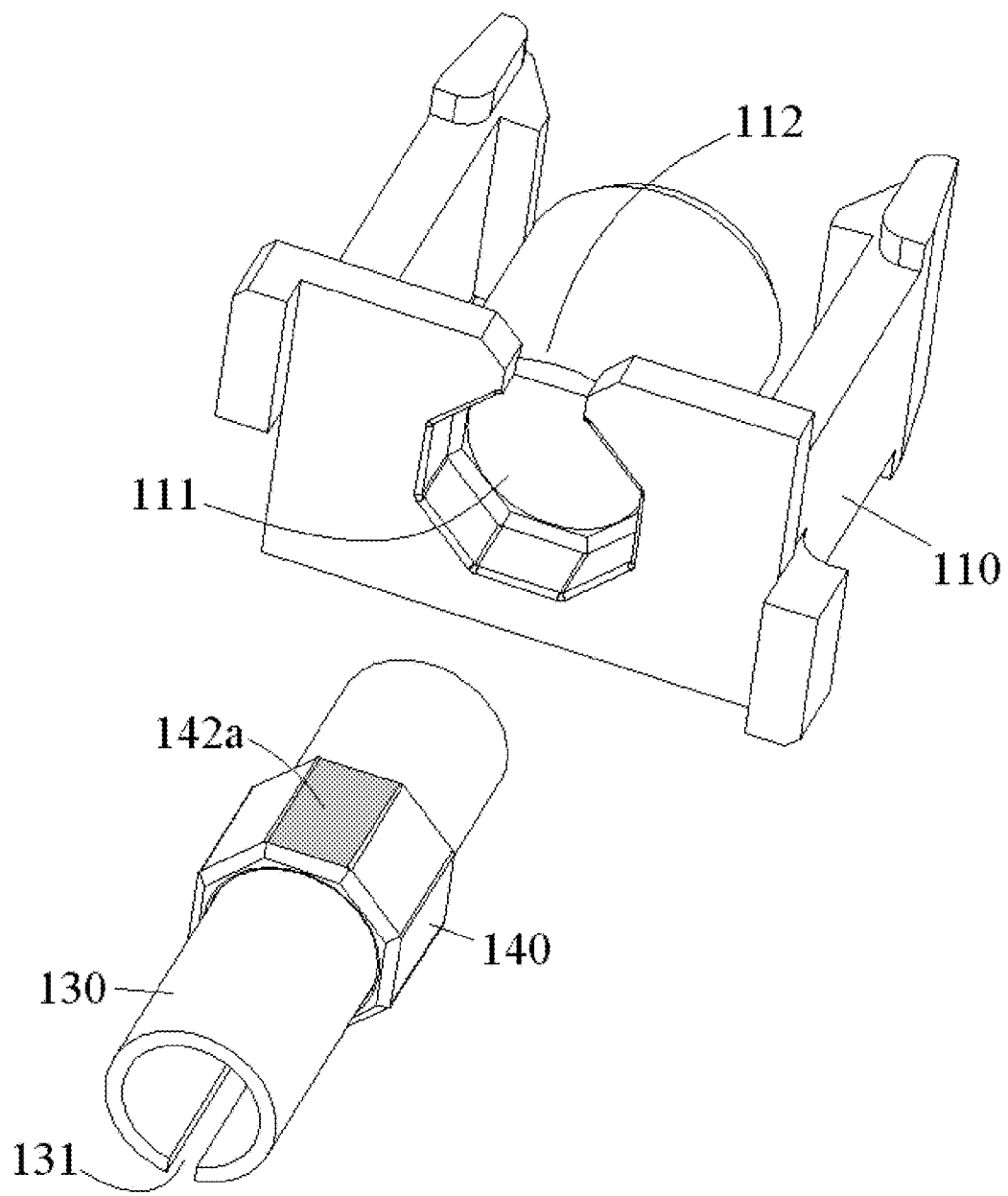
FIGS. 6 and 7 are illustrative views of mounting the alignment sleeve assembly of FIG. 5 to a first mating retainer.
Figure 7:
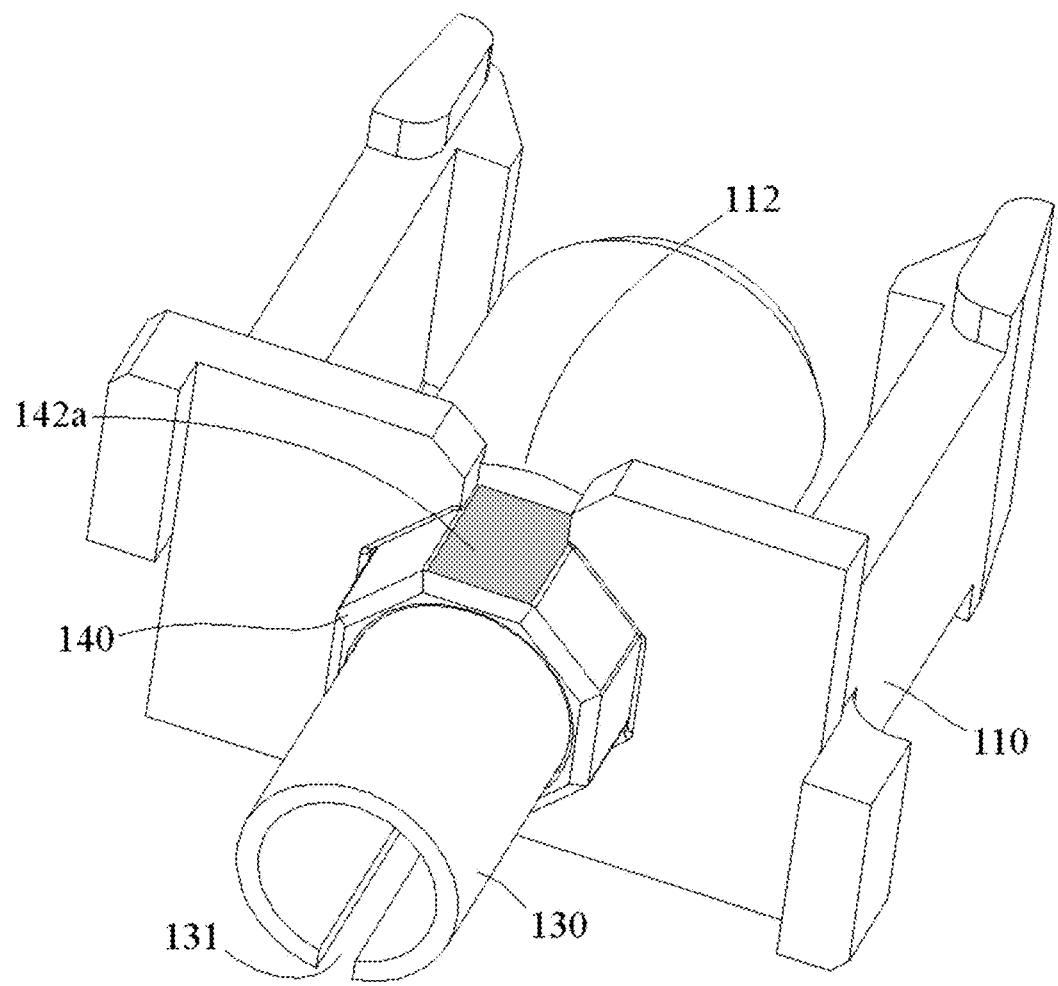
Figure 8:
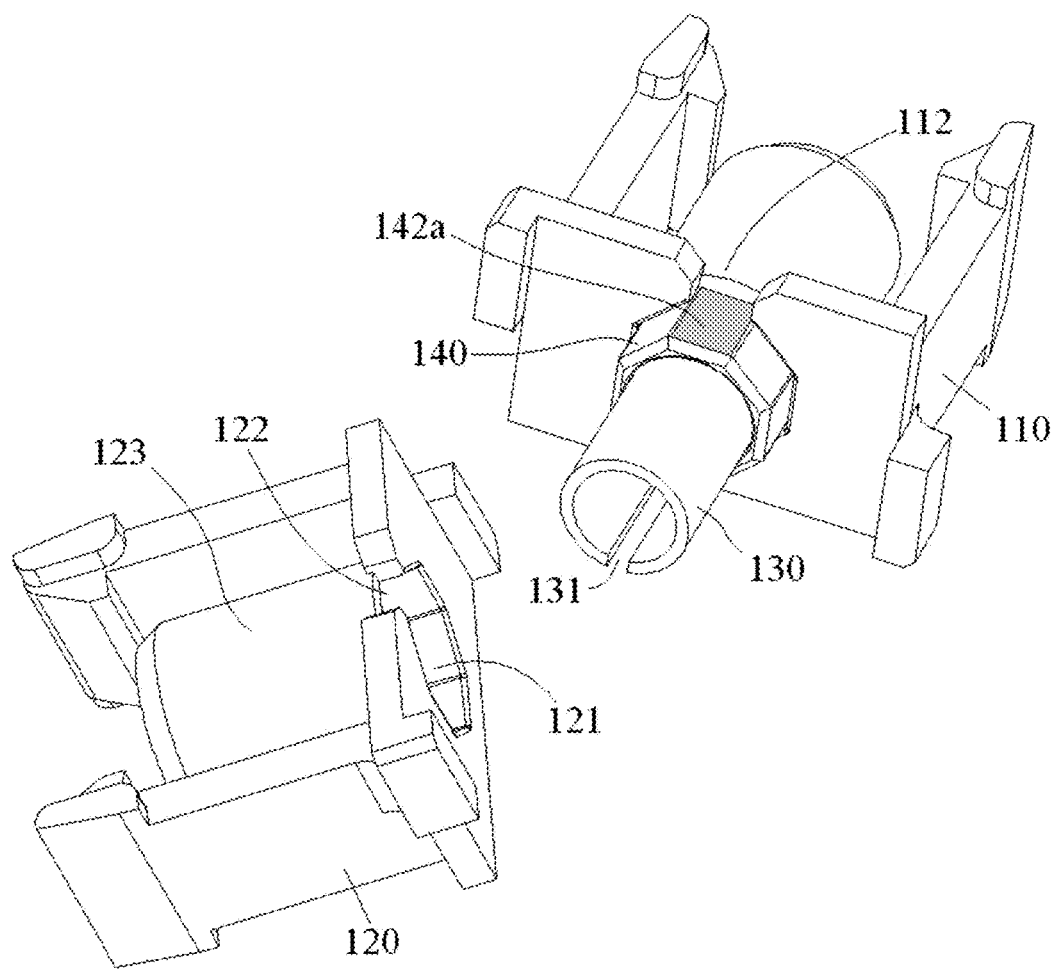
FIGS. 8 and 9 are illustrative views of assembling the first mating retainer of FIG. 7 to a second mating retainer.
Figure 9:
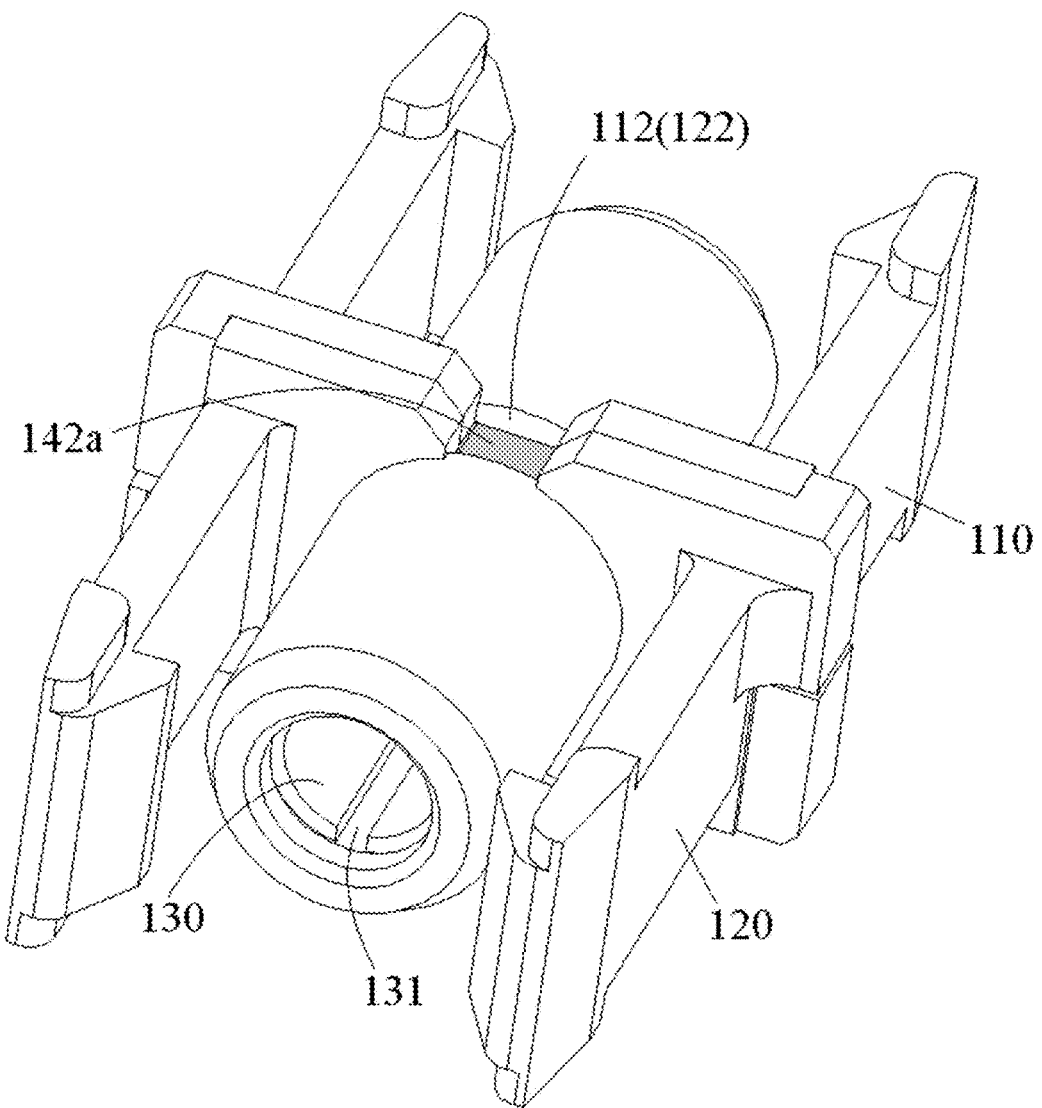

FIGS. 6 and 7 are illustrative views of mounting the alignment sleeve assembly of FIG. 5 to the first mating retainer 110; FIGS. 8 and 9 are illustrative views of assembling the first mating retainer 110 of FIG. 7 to the second mating retainer 120.

As shown in FIGS. 5-9, in an embodiment, after the alignment sleeve 130 is adjusted to the optimum circumferential angle at which the insertion loss of the optical fiber connectors is minimal, a first circumferential angle mark 142a is provided on the outer surface 142 of the adjustment element 140. The first circumferential angle mark 142a is used to identify the optimum circumferential angle of the alignment sleeve 130 relative to the mating retainer 110. In an embodiment, when the alignment sleeve 130 is adjusted to the optimum circumferential angle by the adjustment element 140, the first circumferential angle mark 142a of the adjustment element 140 should be aligned to a second circumferential angle mark 112, 122 formed on the mating retainer 110, 120. In this way, during the alignment sleeve assembly of FIG. 5 is mounted to the mating retainer 110, 120, as long as the first circumferential angle mark 142a of the adjustment element 140 is aligned to the second circumferential angle mark 112, 122 of the mating retainer 110, 120, it may ensure that the alignment sleeve 130 is positioned at the optimum circumferential angle, at which the insertion loss of the optical fiber connectors is minimal, with respect to the mating retainer 110.

In an exemplary embodiment of the present invention, as shown in FIGS. 5-9, the adjustment element 140 is constructed as a polygonal prism with a polygon cross section exhibiting, for example, triangle, quadrilateral, pentagon, hexagon or any other shape with more edges. In another embodiment, the adjustment element 140 may have but not limited to a regular polygon cross section. A positioning slot 111, 121, corresponding to an outer profile of the adjustment element 140, is formed in mating retainer 110, 120. The adjustment element 140 is adapted to be fixed in positioning slot 111, 121 of the mating retainer 110, 120, so as to hold the alignment sleeve 130 at the optimum circumferential angle relative to the mating retainer 110, 120.

Please be noted that the present invention is not limited to the illustrated embodiment, the adjustment element may be fixed on the mating retainer by any other suitable way. For example, in another embodiment, the adjustment element 140 is formed with multiple spline keys; the mating retainer 110, 120 is formed with multiple spline slots. The multiple spline keys of the adjustment element 140 are adapted to be fitted in the multiple spline slots of the mating retainer 110, 120, so as to hold the alignment sleeve 130 at the optimum circumferential angle relative to the mating retainer 110, 120.

Figure 10:
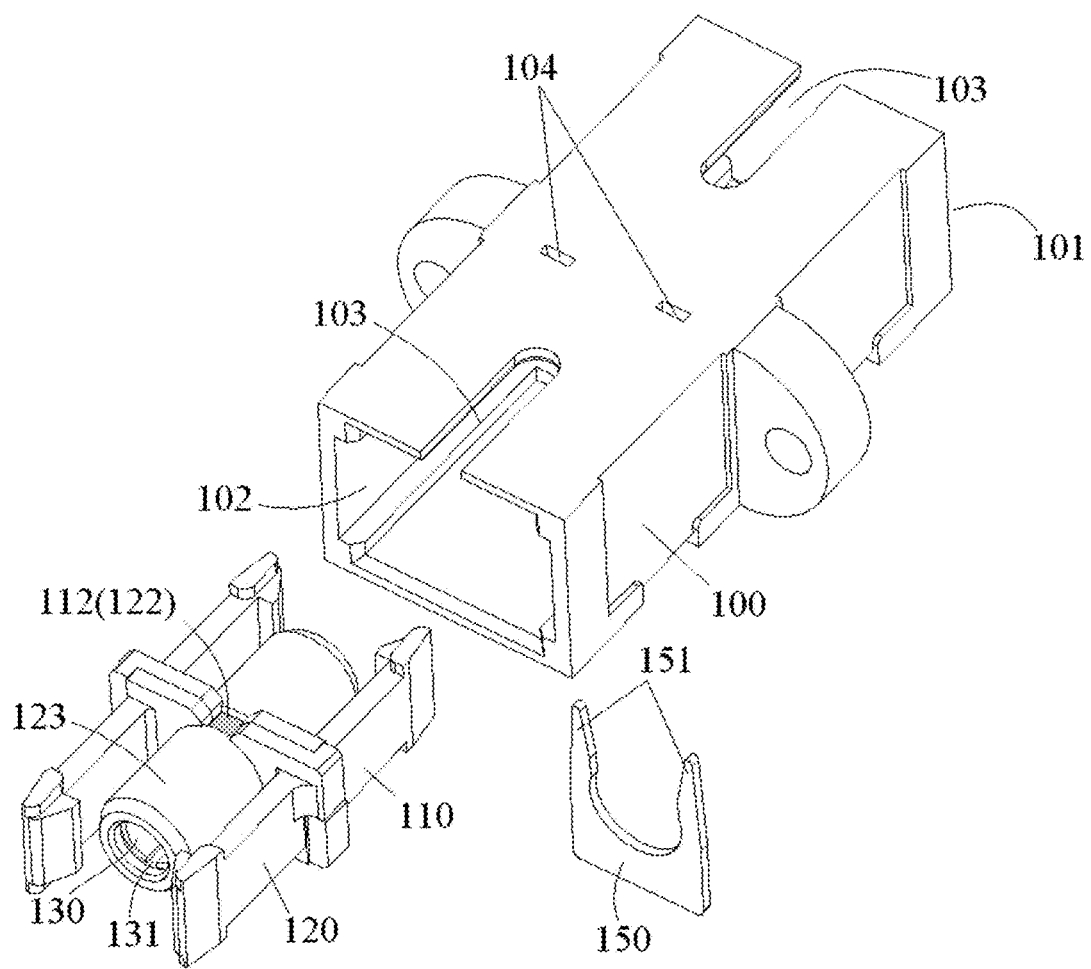
FIG. 10 is an illustrative view of mounting the assembled first and second mating retainers of FIG. 9 to a housing.

FIG. 10 is an illustrative view of mounting the assembled first and second mating retainers 110, 120 of FIG. 9 to a housing 100.

As shown in FIGS. 9 and 10, after the first and second mating retainers 110, 120 are assembled together, the entire mating retainer 110, 120 is mounted in the housing 100.

As shown in FIG. 10, in an embodiment, an alignment slot 103, configured to mate with a sliding block (not shown) on the fiber optic connector, is formed in the housing 100, so as to ensure that the fiber optic connector is inserted into the fiber optic adapter in a correct orientation relative to the fiber optic adapter. When the alignment sleeve 130 is adjusted to and kept at the optimum circumferential angle by the adjustment element 140, the first circumferential angle mark 142a and the second circumferential angle mark 112, 122 are aligned to the alignment slot 103 of the housing 100. In this way, during the mating retainer 110, 120 is mounted to the housing 100, as long as the first circumferential angle mark 142a and the second circumferential angle mark 112, 122 are aligned to the alignment slot 103 of the housing 100, it may ensure that the mating retainer 110, 120 is correctly mounted in the housing 100.

Figure 11:
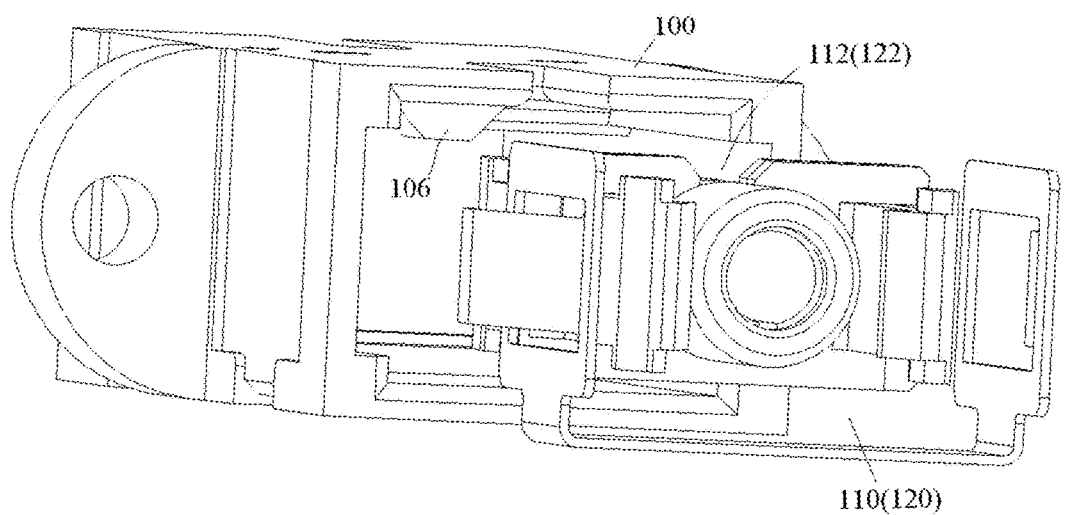
FIG. 11 shows a foolproof installation structure between the housing and the mating retainer.

FIG. 11 shows a foolproof installation structure between the housing 100 and the mating retainer 110, 120.

As shown in FIG. 11, in an embodiment, in order to prevent the mating retainer 110, 120 from being incorrectly mounted to (for example, reversely mounted to) the housing 100, a foolproof installation structure between the housing 100 and the mating retainer 110, 120 is designed.

As shown in FIG. 11, in an embodiment, the second circumferential angle mark 112, 122 of the mating retainer 110, 120 comprises a notch formed in the mating retainer 110, 120. A foolproof assembly protrusion 106, configured to mate with the notch of the mating retainer 110, 120, is formed on an inner wall of the housing 100. The mating retainer 110, 120 is allowed to be assembled into the housing 100 only when the foolproof assembly protrusion 106 of the housing 100 is aligned to the notch of the mating retainer 110, 120. In other words, if the foolproof assembly protrusion 106 of the housing 100 is not aligned to the notch of the mating retainer 110, 120, the retainer 110, 120 is not allowed to be assembled into the housing 100. In this way, it may effectively prevent the mating retainer 110, 120 from being incorrectly mounted to (for example, reversely mounted to) the housing 100.

As shown in FIGS. 1 and 10, the fiber optic adapter may further comprise a fixation element 150 adapted to be mounted on the housing 100 and hold a tube-like body 123 of the mating retainer 110, 120, so as to prevent the mating retainer 110, 120 from being pulled out of the housing 100.

In an embodiment, the fixation element 150 is inserted into the housing 100 through a slot 105 (see FIG. 1) formed in the housing 100. Two legs of the fixation element 150 are inserted into two holes 104 formed in the housing 100. As a result, the tube-like body 123 of the mating retainer 110, 120 is clamped and fixed by the fixation element 150.

Figure 12:
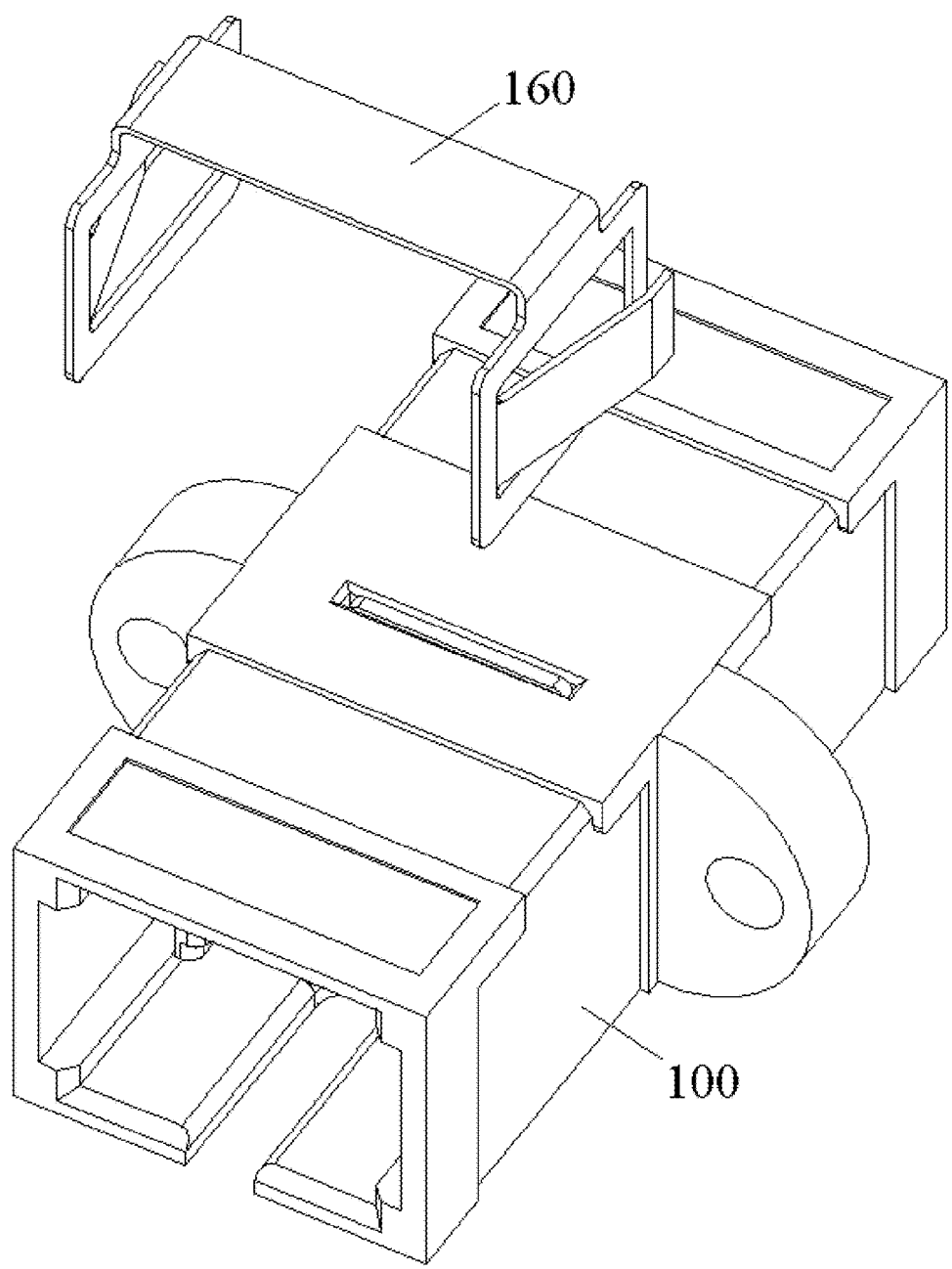
FIG. 12 is an illustrative view of mounting an elastic snapper on the housing.
Figure 13:
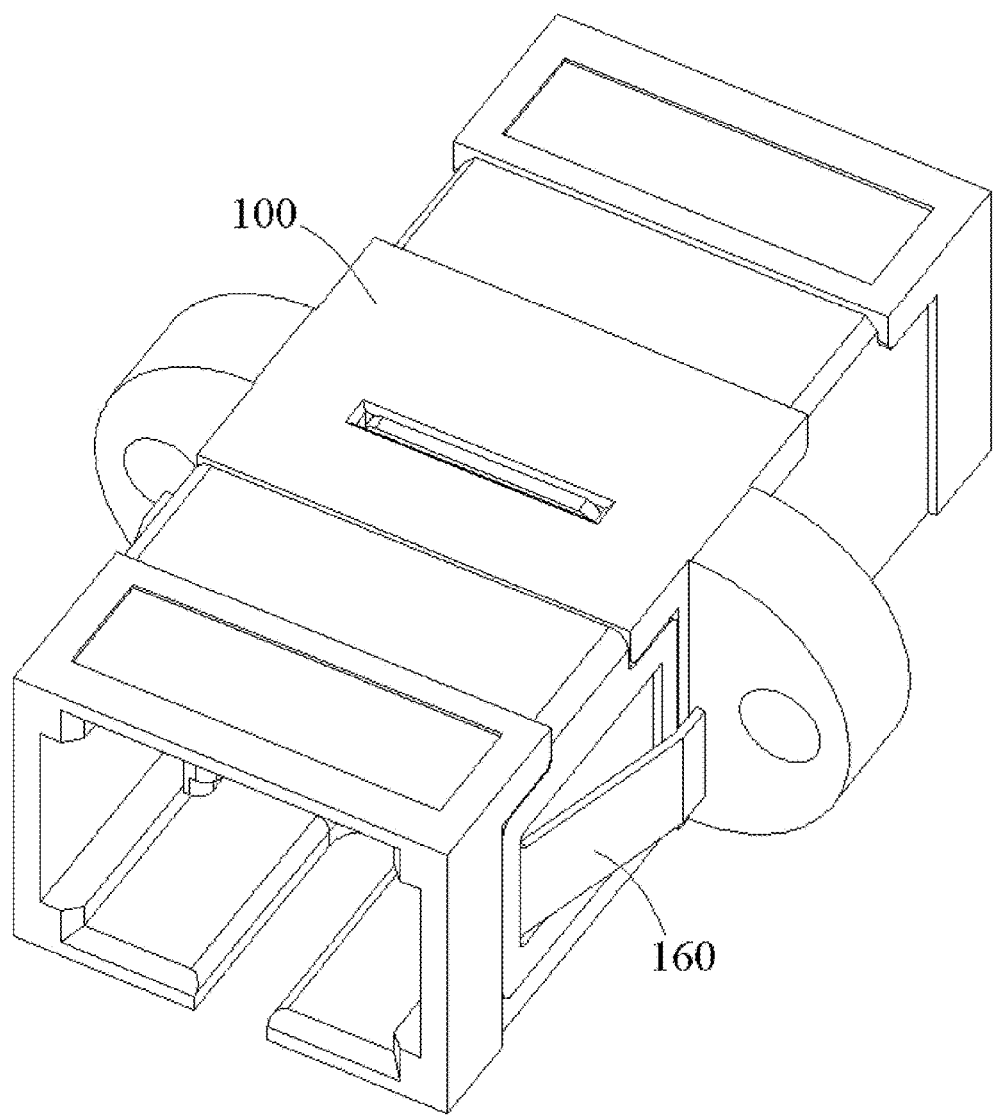
FIG. 13 is an illustrative perspective view of the assembled fiber optic adapter according to the first exemplary embodiment of the present invention.

FIG. 12 is an illustrative view of mounting an elastic snapper 160 on the housing 100; FIG. 13 is an illustrative perspective view of the assembled fiber optic adapter according to the first exemplary embodiment of the present invention.

As shown in FIGS. 12-13, in an embodiment, the fiber optic adapter may further comprise an elastic snapper 160 mounted on the housing 100 and configured to lock the fiber optic adapter in a fixation installation position.

In the first embodiment shown in FIGS. 1-13, the mating retainer 110, 120 comprises the first mating retainer 110 and the second mating retainer 120 capable of being assembled together. The positioning slot 111, 121 comprises a first positioning slot 111 and a second positioning slot 121, aligned to each other, formed in mating ends of the first mating retainer 110 and the second mating retainer 120, respectively. The second circumferential angle mark 112, 122 comprises a first notch 112 and a second notch 122, aligned to each other, formed in the mating ends of the first mating retainer 110 and the second mating retainer 120, respectively.

Also, it should be appreciated that, in some conditions, it is unnecessary to set the insertion loss of the fiber optic connectors inserted into the fiber optic adapter to be minimal, but it is necessary to maintain the longitudinal slot 131 of the alignment sleeve 130 at a specified circumferential angle (a predetermined orientation) with respect to the mating retainer 110, 120. In this case, it is also possible to use the adjustment element 130 to adjust the alignment sleeve 130 to the specified circumferential angle and kept at the specified circumferential angle.

Second Embodiment

Figure 14:
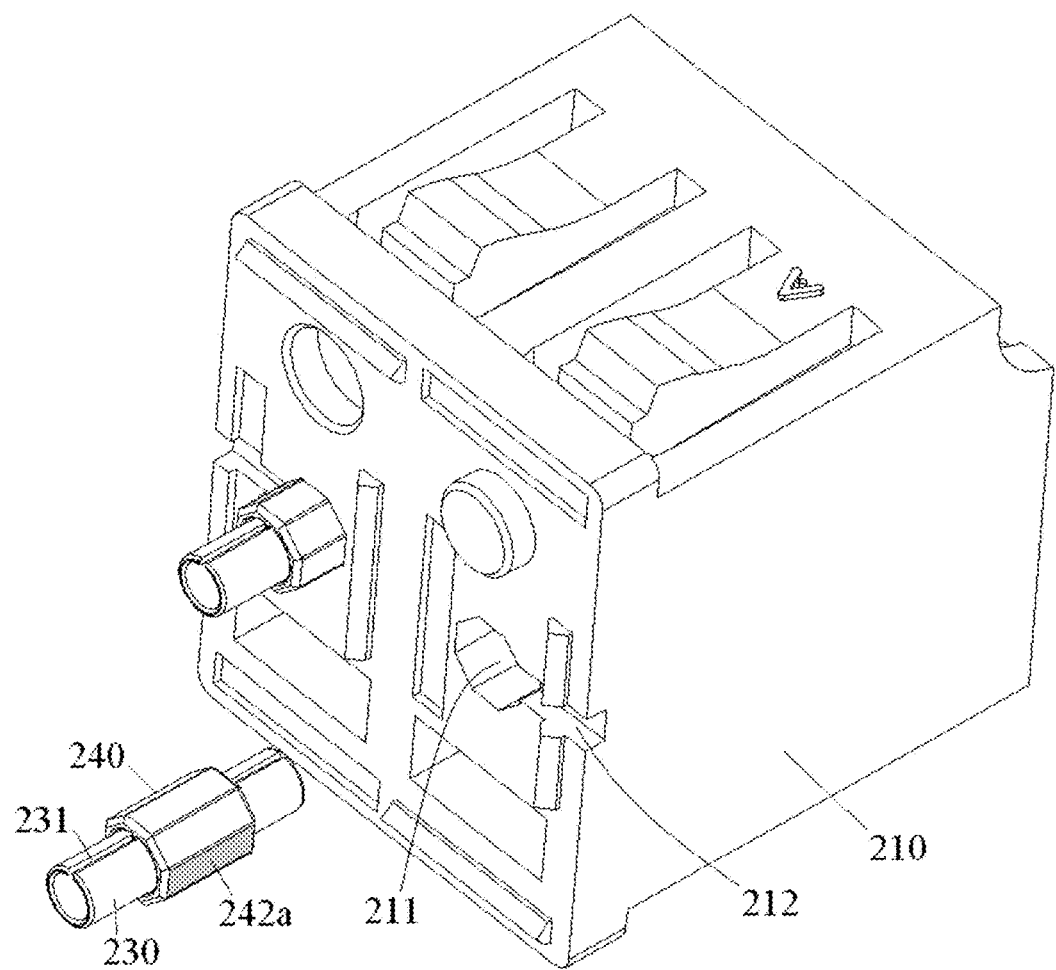
FIG. 14 is an illustrative perspective view of a fiber optic adapter according to a second exemplary embodiment of the present invention, wherein an alignment sleeve assembly is mounted to a first mating retainer.
Figure 15:
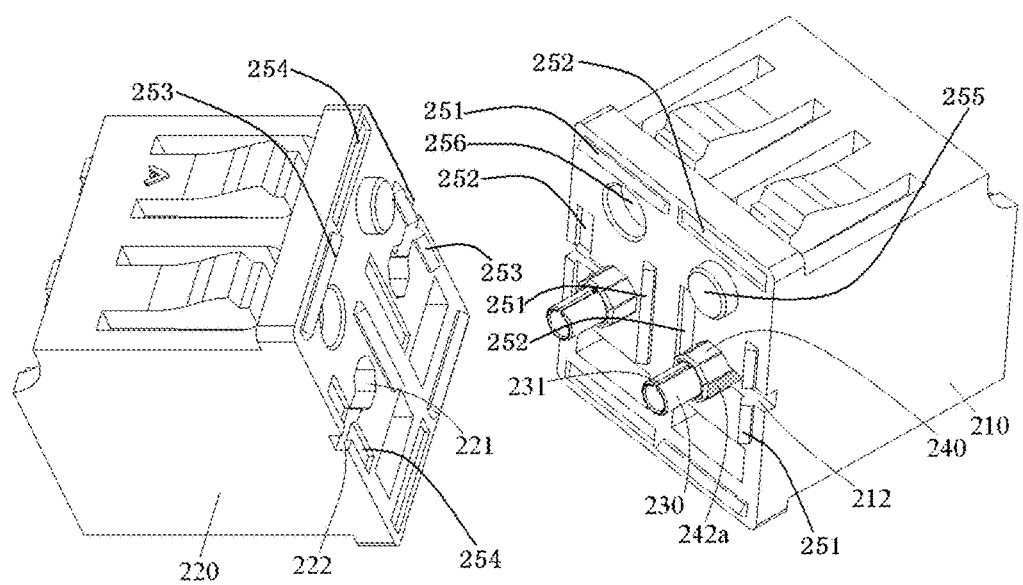
FIG. 15 is an illustrative view of assembling the first mating retainer of FIG. 14 to a second mating retainer.
Figure 16:
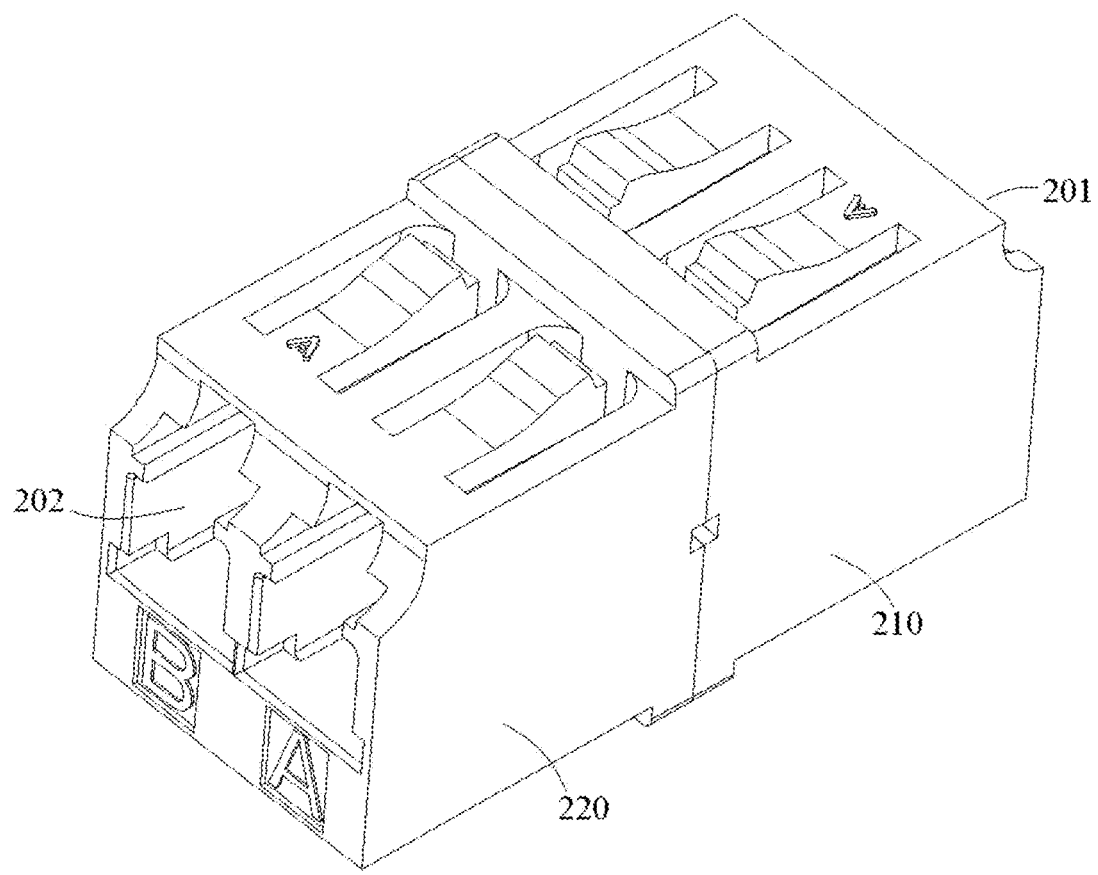
FIG. 16 is an illustrative perspective view of an assembled fiber optic adapter according to a second exemplary embodiment of the present invention.

FIGS. 14-16 show a fiber optic adapter according to a second exemplary embodiment of the present invention.

FIG. 14 is an illustrative perspective view of a fiber optic adapter according to a second exemplary embodiment of the present invention, wherein an alignment sleeve assembly is mounted to a first mating retainer 210; FIG. 15 is an illustrative view of assembling the first mating retainer 210 of FIG. 14 to a second mating retainer 220; and FIG. 16 is an illustrative perspective view of an assembled fiber optic adapter according to a second exemplary embodiment of the present invention.

As shown in FIGS. 14-16, in the second embodiment, the fiber optic adapter is adapted to couple a plurality of pairs of fiber optic connectors at the same time. A plurality of alignment sleeves 230, configured to align ferrules of the pairs of fiber optic connectors, are received in the mating retainer 210, 220.

Also, in the second embodiment shown in FIGS. 14-16, the fiber optic adapter does not comprise a housing, since the mating retainer 210, 220 is served as a body of the fiber optic adapter and is directly exposed outside.

In the second embodiment shown in FIGS. 14-16, the mating retainer 210, 220 comprises a first mating retainer 210 and a second mating retainer 220 capable of being assembled together. The mating retainer 210, 220 is configured to receive the alignment sleeves 130 therein and lock coupled fiber optic connectors (not shown) in place. A ferrule of a fiber optic connector is adapted to be inserted into the alignment sleeve 230 through an insertion port 201, 202 of the fiber optic adapter. In this way, fiber cores of the fiber optic connectors are coupled with each other in the alignment sleeve 230.

In the second embodiment shown in FIGS. 14-16, the adjustment element 240 is configured to adjust a circumferential angle of the alignment sleeve 230 relative to the mating retainer 210, 220 to a predetermined circumferential angle and hold the alignment sleeve 230 at the predetermined circumferential angle relative to the mating retainer 210, 220.

In the second embodiment shown in FIGS. 14-16, when the alignment sleeve 230 is held at the predetermined circumferential angle relative to the mating retainer 210, 220, an alignment error between fiber cores of fibers, inserted into the alignment sleeve 130 fiber optic adapter, of a pair of fiber optic connectors is minimal, that is, an insertion loss is minimal. In this way, it is possible to minimize the insertion loss of the fiber optic connectors by adjusting and positioning the circumferential angle of the alignment sleeve 230 with respect to the mating retainer 210, 220.

Hereafter, it will describe in detail features and operation of assembling components of the optical fiber adapter with reference to drawings.

In the second embodiment shown in FIGS. 14-16, the adjustment element 240 is adapted to be sleeved on the alignment sleeve 230. A radial protrusion 241 is formed on an inner wall of the adjustment element 240 and adapted to be inserted into a longitudinal slot 231 of the alignment sleeve 230, so that the alignment sleeve 230 is capable of being rotated with the alignment element 240, and the circumferential angle of the alignment sleeve 230 relative to the mating retainer 210, 220 is capable of being adjusted by rotating the adjustment element 240.

In an exemplary embodiment of the present invention, the radial protrusion 241 of the adjustment element 240 has a width in a circumferential direction equal to or slightly less than a width of the longitudinal slot 231 of the alignment sleeve 230 in the circumferential direction. In this way, once the radial protrusion 241 of the adjustment element 240 is inserted into the longitudinal slot 231 of the alignment sleeve 230, the alignment sleeve 230 is unable to be rotated in the circumferential direction relative to the adjustment element 240, or is only able to be rotated in a very small angle range in the circumferential direction relative to the adjustment element 240, for example, is only able to be rotated in a range of ±30 degrees, preferably, in a range of ±20 degrees, more preferably, in a range of ±10 degrees.

In the second embodiment shown in FIGS. 14-16, before the alignment sleeve 230 is mounted to the mating retainer 210, 220, the alignment sleeve 230 is adjusted to the optimum circumferential angle, at which the insertion loss of the optical fiber connectors is minimal, by the adjustment element 240.

In the second embodiment shown in FIGS. 14-16, after the alignment sleeve 230 is adjusted to the optimum circumferential angle at which the insertion loss of the optical fiber connectors is minimal, a first circumferential angle mark 242a is provided on the outer surface 242 of the adjustment element 240. The first circumferential angle mark 242a is used to identify the optimum circumferential angle of the alignment sleeve 230 relative to the mating retainer 210. In an embodiment, when the alignment sleeve 230 is adjusted to the optimum circumferential angle by the adjustment element 240, the first circumferential angle mark 242a of the adjustment element 240 should be aligned to a second circumferential angle mark 212, 222 formed on the mating retainer 210, 220. In this way, during the alignment sleeve assembly of FIG. 14 is mounted to the mating retainer 210, 220, as long as the first circumferential angle mark 242a of the adjustment element 240 is aligned to the second circumferential angle mark 212, 222 of the mating retainer 210, 220, it may ensure that the alignment sleeve 230 is positioned at the optimum circumferential angle, at which the insertion loss of the optical fiber connectors is minimal, with respect to the mating retainer 210, 220.

In the second embodiment shown in FIGS. 14-16, the adjustment element 240 is constructed as a polygonal prism with a polygon cross section exhibiting, for example, triangle, quadrilateral, pentagon, hexagon or any other shape with more edges. In another embodiment, the adjustment element 240 may have but not limited to a regular polygon cross section. A positioning slot 211, 221, corresponding to an outer profile of the adjustment element 240, is formed in mating retainer 210, 220. The adjustment element 240 is adapted to be fixed in positioning slot 211, 221 of the mating retainer 210, 220, so as to hold the alignment sleeve 230 at the optimum circumferential angle relative to the mating retainer 210, 220.

Please be noted that the present invention is not limited to the illustrated embodiment, the adjustment element may be fixed on the mating retainer by any other suitable way. For example, in another embodiment, the adjustment element 240 is formed with multiple spline keys; the mating retainer 210, 220 is formed with multiple spline slots. The multiple spline keys of the adjustment element 240 are adapted to be fitted in the multiple spline slots of the mating retainer 210, 220, so as to hold the alignment sleeve 230 at the optimum circumferential angle relative to the mating retainer 210, 220.

In the second embodiment shown in FIGS. 14-16, the second circumferential angle mark 212, 222 of the mating retainer 210, 220 is a notch formed in the mating retainer 210, 220.

In the second embodiment shown in FIGS. 14-16, the mating retainer 210, 220 comprises a first mating retainer 210 and a second mating retainer 220 capable of being assembled together. The positioning slot 211, 221 comprises a first positioning slot 211 and a second positioning slot 221, aligned to each other, formed in mating ends of the first mating retainer 210 and the second mating retainer 220, respectively. The second circumferential angle mark 212, 222 comprises a first notch 212 and a second notch 222, aligned to each other, formed in the mating ends of the first mating retainer 210 and the second mating retainer 220, respectively.

The first mating retainer 210 and the second mating retainer 220 are coupled with each other in a snap-fit manner. In an exemplary embodiment, the first mating retainer 210 is provided with a plurality of first engagement protrusions 251 and a plurality of first engagement recesses 252, and the second mating retainer 220 is provided with a plurality of second engagement protrusions 253, which are engaged with the plurality of first engagement recesses 252, respectively, and a plurality of second engagement recesses 254, which are engaged with the plurality of first engagement protrusions 252, respectively.

Furthermore, the first mating retainer 210 is provided with at least one first guiding protrusions 255 and at least one first guiding recesses 256, and the second mating retainer 220 is provided with at least one second guiding protrusions, which are engaged with the plurality of first engagement recesses 256, respectively, and at least one second guiding recesses, which are engaged with the plurality of first engagement protrusions 255, respectively.

Also, it should be appreciated that, in some conditions, it is unnecessary to set the insertion loss of the fiber optic connectors inserted into the fiber optic adapter to be minimal, but it is necessary to maintain the longitudinal slot 231 of the alignment sleeve 1230 at a specified circumferential angle (a predetermined orientation) with respect to the mating retainer 210, 220. In this case, it is also possible to use the adjustment element 230 to adjust the alignment sleeve 230 to the specified circumferential angle and kept at the specified circumferential angle.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber optic adapter, comprising:
   a mating retainer;
   an alignment sleeve received in the mating retainer, a ferrule of a fiber optic connector being adapted to be inserted into the alignment sleeve through an insertion port of the fiber optic adapter; and
   an adjustment element configured to adjust a circumferential angle of the alignment sleeve relative to the mating retainer to a predetermined circumferential angle and hold the alignment sleeve at the predetermined circumferential angle relative to the mating retainer, wherein when the alignment sleeve is held at the predetermined circumferential angle relative to the mating retainer, an alignment error between fiber cores of fibers of a pair of fiber optic connectors, inserted into the alignment sleeve of the fiber optic adapter, is minimal, wherein when the alignment sleeve is held at the predetermined circumferential angle relative to the mating retainer, a longitudinal slot in the alignment sleeve is positioned at a predetermined orientation, wherein the adjustment element is adapted to be sleeved on the alignment sleeve, and a radial protrusion is formed on an inner wall of the adjustment element and adapted to be inserted into the longitudinal slot of the alignment sleeve, so that the alignment sleeve is rotatable with the alignment element, and the circumferential angle of the alignment sleeve relative to the mating retainer is adjustable by rotating the adjustment element, and wherein when the radial protrusion of the adjustment element is inserted into the longitudinal slot of the alignment sleeve, the alignment sleeve is limited to be rotated in a range of ±30 degrees in a circumferential direction relative to the adjustment element.

2. The fiber optic adapter according to claim 1, wherein when the radial protrusion of the adjustment element is inserted into the longitudinal slot of the alignment sleeve, the alignment sleeve is limited to be rotated in a range of ±20 degrees in a circumferential direction relative to the adjustment element.

3. The fiber optic adapter according to claim 1, wherein when the radial protrusion of the adjustment element is inserted into the longitudinal slot of the alignment sleeve, the alignment sleeve is limited to be rotated in a range of ±10 degrees in a circumferential direction relative to the adjustment element.

4. The fiber optic adapter according to claim 1,
wherein the adjustment element is formed as a polygonal prism with a polygon cross section;
wherein a positioning slot, corresponding to an outer profile of the adjustment element, is formed in the mating retainer; and
wherein the adjustment element is adapted to be fixed in the positioning slot of the mating retainer, so as to hold the alignment sleeve at the predetermined circumferential angle relative to the mating retainer.

5. The fiber optic adapter according to claim 4,
wherein a first circumferential angle mark is provided on an outer surface of the adjustment element, and a second circumferential angle mark is provided on the mating retainer; and
when the alignment sleeve is adjusted to the predetermined circumferential angle by the adjustment element, the first circumferential angle mark of the adjustment element is aligned with the second circumferential angle mark of the mating retainer.

6. The fiber optic adapter according to claim 5, further comprising a housing in which the mating retainer is mounted; and
wherein an alignment slot, configured to mate with a sliding block on the fiber optic connector, is formed in the housing, so as to ensure the fiber optic connector is inserted into the fiber optic adapter in a correct orientation relative to the fiber optic adapter.

7. The fiber optic adapter according to claim 6,
wherein when the alignment sleeve is adjusted to the predetermined circumferential angle by the adjustment element, the first circumferential angle mark and the second circumferential angle mark are aligned with the alignment slot of the housing.

8. The fiber optic adapter according to claim 7,
wherein the second circumferential angle mark of the mating retainer comprises a notch formed in the mating retainer;

wherein a foolproof assembly protrusion, configured to mate with the notch of the mating retainer, is formed on an inner wall of the housing; and
wherein the mating retainer is assembled into the housing only when the foolproof assembly protrusion of the housing is aligned with the notch of the mating retainer.

9. The fiber optic adapter according to claim 6, further comprising a fixation element adapted to be mounted on the housing and hold a tube-like body of the mating retainer, so as to prevent the mating retainer from being pulled out of the housing.

10. The fiber optic adapter according to claim 6, further comprising an elastic snapper mounted on the housing and configured to lock the fiber optic adapter in a fixation installation position.

11. The fiber optic adapter according to claim 4,
wherein the mating retainer comprises a first mating retainer and a second mating retainer being assembled together.

12. The fiber optic adapter according to claim 11,
wherein the positioning slot comprises a first positioning slot and a second positioning slot, aligned to each other, formed in mating ends of the first mating retainer and the second mating retainer, respectively.

13. The fiber optic adapter according to claim 12,
wherein the second circumferential angle mark comprises a first notch and a second notch, aligned to each other, formed in the mating ends of the first mating retainer and the second mating retainer, respectively.

14. The fiber optic adapter according to claim 1,
wherein the adjustment element is formed with multiple spline keys, and the mating retainer is formed with multiple spline slots; and
wherein the multiple spline keys of the adjustment element are adapted to be fitted in the multiple spline slots of the mating retainer, so as to hold the alignment sleeve at the predetermined circumferential angle relative to the mating retainer.

15. The fiber optic adapter according to claim 1,
wherein the fiber optic adapter is adapted to interconnect one or more pairs of fiber optic connectors at the same time; and
wherein the mating retainer of the fiber optic adapter is configured to receive an alignment sleeve for aligning the ferrules of each of the one or more pairs of fiber optic connectors.

16. An alignment sleeve assembly, comprising:
an alignment sleeve adapted to be received in a mating retainer of a fiber optic adapter; and
an adjustment element configured to adjust a circumferential angle of the alignment sleeve relative to the mating retainer to a predetermined circumferential angle and hold the alignment sleeve at the predetermined circumferential angle relative to the mating retainer, wherein the adjustment element is adapted to be sleeved on the alignment sleeve, and a radial protrusion is formed on an inner wall of the adjustment element and adapted to be inserted into a longitudinal slot of the alignment sleeve, so that the alignment sleeve is rotatable with the alignment element, and the circumferential angle of the alignment sleeve relative to the mating retainer is adjustable by rotating the adjustment element, wherein when the radial protrusion of the adjustment element is inserted into the longitudinal slot of the alignment sleeve, the alignment sleeve is limited to be rotated in a range of ±30 degrees in a circumferential direction relative to the adjustment element.

17. The alignment sleeve assembly according to claim 16, wherein the adjustment element is formed as a polygonal prism with a polygon cross section.

18. The alignment sleeve assembly according to claim 17, wherein a first circumferential angle mark, configured to identify the predetermined circumferential angle of the alignment sleeve relative to the mating retainer, is provided on an outer surface of the adjustment element.

19. The alignment sleeve assembly according to claim 16, wherein when the radial protrusion of the adjustment element is inserted into the longitudinal slot of the alignment sleeve, the alignment sleeve is limited to be rotated in a range of ±20 degrees in a circumferential direction relative to the adjustment element.

20. The alignment sleeve assembly according to claim 16, wherein when the radial protrusion of the adjustment element is inserted into the longitudinal slot of the alignment sleeve, the alignment sleeve is limited to be rotated in a range of ±10 degrees in a circumferential direction relative to the adjustment element.

21. A fiber optic adapter, comprising:
a mating retainer;
an alignment sleeve received in the mating retainer, a ferrule of a fiber optic connector being adapted to be inserted into the alignment sleeve through an insertion port of the fiber optic adapter; and
an adjustment element configured to adjust a circumferential angle of the alignment sleeve relative to the mating retainer to a predetermined circumferential angle and hold the alignment sleeve at the predetermined circumferential angle relative to the mating retainer, wherein when the alignment sleeve is held at the predetermined circumferential angle relative to the mating retainer, an alignment error between fiber cores of fibers of a pair of fiber optic connectors, inserted into the alignment sleeve of the fiber optic adapter, is minimal, wherein when the alignment sleeve is held at the predetermined circumferential angle relative to the mating retainer, a longitudinal slot in the alignment sleeve is positioned at a predetermined orientation, wherein the adjustment element is adapted to be sleeved on the alignment sleeve, and a radial protrusion is formed on an inner wall of the adjustment element and adapted to be inserted into the longitudinal slot of the alignment sleeve, so that the alignment sleeve is rotatable with the alignment element, and the circumferential angle of the alignment sleeve relative to the mating retainer is adjustable by rotating the adjustment element, and wherein the adjustment element is formed as a polygonal prism with a polygon cross section, wherein a positioning slot, corresponding to an outer profile of the adjustment element, is formed in the mating retainer, and wherein the adjustment element is adapted to be fixed in the positioning slot of the mating retainer, so as to hold the alignment sleeve at the predetermined circumferential angle relative to the mating retainer.

22. A fiber optic adapter, comprising:
a mating retainer;
an alignment sleeve received in the mating retainer, a ferrule of a fiber optic connector being adapted to be inserted into the alignment sleeve through an insertion port of the fiber optic adapter; and
an adjustment element configured to adjust a circumferential angle of the alignment sleeve relative to the mating retainer to a predetermined circumferential angle and hold the alignment sleeve at the predetermined circumferential angle relative to the mating retainer, wherein when the alignment sleeve is held at the predetermined circumferential angle relative to the mating retainer, an alignment error between fiber cores of fibers of a pair of fiber optic connectors, inserted into the alignment sleeve of the fiber optic adapter, is minimal, wherein when the alignment sleeve is held at the predetermined circumferential angle relative to the mating retainer, a longitudinal slot in the alignment sleeve is positioned at a predetermined orientation, wherein the adjustment element is adapted to be sleeved on the alignment sleeve, and a radial protrusion is formed on an inner wall of the adjustment element and adapted to be inserted into the longitudinal slot of the alignment sleeve, so that the alignment sleeve is rotatable with the alignment element, and the circumferential angle of the alignment sleeve relative to the mating retainer is adjustable by rotating the adjustment element, and wherein the adjustment element is formed with multiple spline keys, and the mating retainer is formed with multiple spline slots, and wherein the multiple spline keys of the adjustment element are adapted to be fitted in the multiple spline slots of the mating retainer, so as to hold the alignment sleeve at the predetermined circumferential angle relative to the mating retainer.

23. An alignment sleeve assembly, comprising:
an alignment sleeve adapted to be received in a mating retainer of a fiber optic adapter; and
an adjustment element configured to adjust a circumferential angle of the alignment sleeve relative to the mating retainer to a predetermined circumferential angle and hold the alignment sleeve at the predetermined circumferential angle relative to the mating retainer, wherein the adjustment element is adapted to be sleeved on the alignment sleeve, and a radial protrusion is formed on an inner wall of the adjustment element and adapted to be inserted into a longitudinal slot of the alignment sleeve, so that the alignment sleeve is rotatable with the alignment element, and the circumferential angle of the alignment sleeve relative to the mating retainer is adjustable by rotating the adjustment element, wherein when the radial protrusion of the adjustment element is inserted into the longitudinal slot of the alignment sleeve, the alignment sleeve is limited to be rotated in a circumferential direction relative to the adjustment element, and wherein the adjustment element is formed as a polygonal prism with a polygon cross section.

* * * * *